US012713475B2

(12) United States Patent
Li et al.

(10) Patent No.: US 12,713,475 B2
(45) Date of Patent: Aug. 18, 2026

(54) LOCAL NETWORK ACCESSING METHOD AND APPARATUS

(71) Applicant: HUAWEI TECHNOLOGIES CO., LTD., Shenzhen (CN)

(72) Inventors: Yongcui Li, Beijing (CN); Hui Ni, Beijing (CN); Yizhuang Wu, Beijing (CN); Fangyuan Zhu, Beijing (CN); Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 596 days.

(21) Appl. No.: 18/161,885

(22) Filed: Jan. 30, 2023

(65) Prior Publication Data

US 2023/0269794 A1 Aug. 24, 2023

Related U.S. Application Data

(63) Continuation of application No. PCT/CN2021/107254, filed on Jul. 20, 2021.

(30) Foreign Application Priority Data

Jul. 31, 2020 (CN) ......................... 202010759371.3
Apr. 2, 2021 (CN) ......................... 202110363865.4
May 10, 2021 (CN) ......................... 202110507770.5

(51) Int. Cl.
*H04W 76/11* (2018.01)
*H04W 48/08* (2009.01)

(52) U.S. Cl.
CPC ............ *H04W 76/11* (2018.02); *H04W 48/08* (2013.01)

(58) Field of Classification Search
CPC ........................... H04W 76/11; H04L 12/2803
See application file for complete search history.

(56) References Cited

U.S. PATENT DOCUMENTS

2011/0138005 A1* 6/2011 Zhou ..................... H04W 76/30 709/206
2011/0161504 A1 6/2011 Zhou et al.
(Continued)

FOREIGN PATENT DOCUMENTS

CN 101730040 A 6/2010
CN 110166414 A 8/2019
(Continued)

OTHER PUBLICATIONS

Nokia, Alcatel-Lucent Shanghai Bell, Definition on PDU-CAN session. SA WG2 Meeting #121, May 15-19, 2017, Hangzhou, China, S2-173443, 4 pages.
3GPP TS 23.502 V16.5.0 (Jul. 2020), 3rd Generation Partnership Project; Technical Specification Group Services and System Aspects; Procedures for the 5G System (5GS); Stage 2(Release 16), 594 pages.
Ericsson, Deutsche Telekom, Connectivity Models for Edge Computing. 3GPP TSG-SA/WG2 Meeting #136-AH, Jan. 13-17, 2020, Incheon, Korea, S2-2001548, 5 pages.
(Continued)

*Primary Examiner* — Fabricio R Murillo Garcia

(57) ABSTRACT

A local network accessing method and apparatus are provided. The local network accessing method comprises sending a trigger message to a terminal, the trigger message is for triggering the terminal to establish a session, receiving a first message from the terminal, the first message requesting to establish a first session, and the first session is for the terminal to access a target local network, determining a target network access identifier based on the first message, the target network access identifier indicating the target local network, determining a first session management function network element based on the target network access identifier, and sending the target network access identifier to the first session management function network element, the target network access identifier is for the first session management function network element to determine a target user plane function network element.

14 Claims, 11 Drawing Sheets

(56) References Cited

U.S. PATENT DOCUMENTS

| | | | | |
|---|---|---|---|---|
| 2019/0053104 | A1 | 2/2019 | Qiao et al. | |
| 2019/0059067 | A1 | 2/2019 | Lee et al. | |
| 2019/0098537 | A1* | 3/2019 | Qiao | H04W 36/0033 |
| 2019/0357014 | A1 | 11/2019 | Hu et al. | |
| 2019/0387401 | A1* | 12/2019 | Liao | H04W 4/08 |
| 2020/0296653 | A1* | 9/2020 | Huang | H04W 40/00 |
| 2021/0168585 | A1* | 6/2021 | Li | H04W 8/12 |
| 2021/0195554 | A1* | 6/2021 | Singh | H04W 60/04 |

FOREIGN PATENT DOCUMENTS

| | | | |
|---|---|---|---|
| CN | 110167003 | A | 8/2019 |
| CN | 110351777 | A | 10/2019 |
| CN | 110650504 | A | 1/2020 |
| CN | 111436160 | A | 7/2020 |
| EP | 4125284 | A1 | 2/2023 |
| WO | 2019137125 | A1 | 7/2019 |

OTHER PUBLICATIONS

3GPP TS 23.501 V16.5.0 (Jul. 2020), 3rd Generation Partnership Project; Technical Specification Group Services and System Aspects; System architecture for the 5G System (5GS); Stage 2(Release 16), 441 pages.

CATT, ZTE, Apple, KI #5, New Sol: Activating the traffic routing towards LDN per AF request. SA WG2 Meeting #S2-139E, Elbonia, Jun. 1, 5, 2020, S2-2004435, 4 pages.

Samsung, Qualcomm Incorporated, TS 23.502—Update 4.3.2 PDU Session establishment for LADN. SA WG2 Meeting #S2-120, Mar. 27-31, 2017, Busan, South Korea, S2-171942, 6 pages.

Samsung, Qualcomm Incorporated, Discussion: Roaming support for LADN. SA WG2 Meeting #S2-126, Feb. 26-Mar. 2, 2018, Montreal, Canada, S2-181659, 5 pages.

* cited by examiner

Terminal 210

Application client 211

Edge enabler client 212

EDN 220

Edge application 221

Edge enabler server 222

Edge configuration server 230

First device

AF

1201: Discovery request, where the discovery request requests to discover an EAS, and the discovery request includes a preset condition 1202: Determine, based on the discovery request, at least one EAS that satisfies the preset condition 1203: Discovery response message, where the discovery response message includes an IP address of the at least one EAS

LOCAL NETWORK ACCESSING METHOD AND APPARATUS

CROSS-REFERENCE TO RELATED APPLICATIONS

This application is a continuation of International Application No. PCT/CN2021/107254, filed on Jul. 20, 2021, which claims priority to Chinese Patent Application No. 202010759371.3, filed on Jul. 31, 2020, Chinese Patent Application No. 202110363865.4, filed on Apr. 2, 2021, and Chinese Patent Application No. 202110507770.5, filed on May 10, 2021. All of the aforementioned patent applications are hereby incorporated by reference in their entireties.

TECHNICAL FIELD

This application relates to the communications field, and more specifically, to a local network accessing method and an apparatus.

BACKGROUND

Rapid development of mobile communication promotes continuous emergence of various new services. In addition to conventional mobile bandwidth and a conventional internet of things, the mobile communication has spawned many new application fields such as an augmented reality (AR)/virtual reality (VR) technology, an internet of vehicles, industrial control, and also poses higher requirements on performance such as network bandwidth and a latency. Therefore, in addition to a 5G application architecture, a mobile edge computing (MEC) technology is proposed to effectively satisfy high-bandwidth and low-latency requirements of rapid development of a mobile internet and the internet of things and reduce network load.

Compared with a data network (DN) in the 5G application architecture, a local DN in a MEC architecture can provide a service for a user in an edge area closer to a terminal. In other words, a service, a service processing function, and a resource scheduling function are deployed in an edge network close to the terminal, to provide low-latency service experience.

After the MEC architecture is introduced, how the terminal accesses the local DN in the MEC architecture to satisfy a requirement of a low-latency service needs to be urgently resolved.

SUMMARY

This application provides a local network accessing method and an apparatus. In this way, a local DN can be accessed, so that a requirement of a low-latency service can be satisfied, and service processing performance can be improved.

According to a first aspect, a local network accessing method is provided. The method includes: obtaining a first network access identifier, where the first network access identifier indicates a first local network; and sending a session establishment request to a session management function network element, where the session establishment request requests to establish a first session, the first session is for a terminal to access the first local network, and the session establishment request includes the first network access identifier.

When obtaining the first network access identifier indicating the first local network, the terminal may actively send the session establishment request to the session management function network element to request to establish the first session. The first session is for the terminal to access the first local network, and the session establishment request includes the first network access identifier. In other words, the terminal can access a local network, so that a requirement of a low-latency service can be satisfied, and service processing performance is improved.

In some implementations, the method further includes: obtaining at least one service and at least one network access identifier corresponding to the at least one service, where the at least one service includes a first service, and the obtaining a first network access identifier includes: determining, based on the first service, the first network access identifier corresponding to the first service, where the at least one network access identifier includes the first network access identifier.

After obtaining the at least one service and the at least one network access identifier corresponding to the at least one service, the terminal may determine a network access identifier corresponding to any service. In this way, the terminal can access local networks for different services, so that the requirement of the low-latency service can be satisfied, and service processing performance is improved.

In some implementations, the obtaining at least one service and at least one network access identifier corresponding to the at least one service includes: receiving a registration accept message from an access and mobility management function, where the registration accept message includes the at least one service and the at least one network access identifier corresponding to the at least one service; or receiving a configuration update command message from an access and mobility management function, where the configuration update command message includes the at least one service and the at least one network access identifier corresponding to the at least one service.

The terminal may obtain, by using different messages, the at least one service and the at least one network access identifier corresponding to the at least one service, to improve flexibility of obtaining a network access identifier.

In some implementations, the method further includes: obtaining at least one location of the terminal and at least one network access identifier corresponding to the at least one location, where the at least one location of the terminal includes a first location, and the obtaining a first network access identifier includes: determining, based on the first location, the first network access identifier corresponding to the first location, where the at least one network access identifier includes the first network access identifier.

Different locations of the terminal may correspond to different network access identifiers. In this way, after obtaining the at least one location and the at least one network access identifier corresponding to the at least one location, the terminal may obtain a network access identifier corresponding to any location. In this way, the terminal can access local networks for the terminal at the different locations, so that the requirement of the low-latency service can be satisfied, and service processing performance is improved.

In some implementations, the method further includes: determining, based on the first location and the first service, the first network access identifier corresponding to the first location and the first service.

The terminal may determine, with reference to a location (namely, the first location) of the terminal and the first service initiated by the terminal, the network access identifier corresponding to the first location and the first service. In this way, the terminal can access local networks for the terminal located at the different locations and initiating different services, so that service processing performance can be further improved while the requirement of the low-latency service is satisfied.

In some implementations, the determining, based on the first location and the first service, the first network access identifier corresponding to the first location and the first service includes: determining the first network access identifier based on the at least one service, the at least one network access identifier corresponding to the at least one service, the at least one location, the at least one network access identifier corresponding to the at least one location, the first location, and the first service.

In this way, the terminal can determine, based on the first service, network access identifier(s) corresponding to the first service, and then determine, based on the first location, network access identifier(s) corresponding to the first location. Then, the terminal may use a same network access identifier in the network access identifier(s) corresponding to the first service and the network access identifier(s) corresponding to the first location as the first network access identifier. In this way, the terminal can access the local networks for the terminal at the different locations and the different services, so that the requirement of the low-latency service can be satisfied, and service processing performance is improved.

In some implementations, the method further includes: receiving, from the session management function network element, at least one network access identifier corresponding to a first location of the terminal; and the obtaining a first network access identifier includes: determining the first network access identifier in the at least one network access identifier.

The terminal may first obtain the at least one network access identifier corresponding to the first location of the terminal, and then further select the first network access identifier from the at least one network access identifier. In this way, the first network access identifier is selected from a smaller range, to further select an appropriate network access identifier, and further improve service processing performance.

In some implementations, the determining the first network access identifier in the at least one network access identifier includes: selecting, from the at least one network access identifier based on a first service, the first network access identifier corresponding to the first service.

In this way, the first network access identifier is selected from the smaller range, to further select appropriate network access identifiers for different services, and further improve service processing performance.

In some implementations, the method further includes: obtaining the at least one service and the at least one network access identifier corresponding to the at least one service, where the at least one service includes a second service; determining, based on the second service, a network access identifier corresponding to the second service; and sending the second service based on a relationship between the network access identifier corresponding to the second service and the first network access identifier.

The terminal may determine, depending on whether the network access identifier corresponding to the second service is the same as the first network access identifier, a session for sending the second service. This helps the terminal select an appropriate session, and improves service processing efficiency.

In some implementations, the sending the second service based on a relationship between the network access identifier corresponding to the second service and the first network access identifier includes: if the network access identifier corresponding to the second service is the same as the first network access identifier, sending the second service by using the first session; if the network access identifier corresponding to the second service is different from the first network access identifier, sending the second service by using a second session, where the second session is for the terminal to access a central network; or if the network access identifier corresponding to the second service is different from the first network access identifier, sending the second service by using a third session, where the third session is for the terminal to access a local network corresponding to the second service.

The terminal may determine, when the network access identifier corresponding to the second service is the same as the first network access identifier, that the first session is used for sending the second service, to reduce signaling overheads of session reestablishment.

According to a second aspect, a local network accessing method is provided. The method includes: receiving a trigger message, where the trigger message is for triggering a terminal to establish a session; and sending a first message based on the trigger message, where the first message requests to establish a first session, and the first session is for the terminal to access a local network.

A session management function network element may actively trigger the terminal to initiate establishment of a session for accessing the local network. In this way, the local network is accessed, so that a requirement of a low-latency service is satisfied, and service processing performance is improved.

In some implementations, the first message further includes a session identifier of a second session, and the second session is for the terminal to access a central network.

In some implementations, the method further includes: selecting a target session for a target service from the first session and the second session based on a first routing condition and a second routing condition, where the first routing condition corresponds to the first session, and the second routing condition corresponds to the second session; and sending the target service by using the target session.

The first routing condition is a condition for the terminal to select the first session, and the second routing condition is a condition for the terminal to select the second session. In this way, when starting the target service, the terminal can determine, based on the first routing condition and the second routing condition, whether to select a first route or a second route. Then, the terminal sends the target service through a selected route, to help select an appropriate route to send the target service, and improve service processing efficiency.

In some implementations, the method further includes: sending first information, where the first information includes a service identifier of a target service; receiving second information, where the second information includes a session identifier of a target session corresponding to the service identifier of the target service; and sending the target service by using the target session.

According to a third aspect, a local network accessing method is provided. The method includes: sending a trigger message to a terminal, where the trigger message is for triggering the terminal to establish a session; receiving a first session establishment request from the terminal, where the first session establishment request requests to establish a first session, and the first session is for the terminal to access a local network; determining a target network access identifier based on the first session establishment request, where the target network access identifier indicates a target local network; and determining a target UPF based on the target network access identifier.

A session management function network element may actively trigger the terminal to initiate establishment of a session for accessing the local network. In this way, the local network is accessed, so that a requirement of a low-latency service is satisfied, and service processing performance is improved.

In some implementations, the first session establishment request includes a session identifier of a second session, and the second session is for the terminal to access a central network; and the determining a target network access identifier based on the first session establishment request includes: determining the target network access identifier based on the session identifier of the second session and a mapping relationship, where the mapping relationship is a mapping relationship between at least one session identifier of at least one session and at least one network access identifier of at least one local network.

The session management function network element may learn of, based on a preset mapping relationship, the target network access identifier corresponding to the session identifier of the second session. In this way, the terminal accesses the local network by using the target network access identifier, so that the requirement of the low-latency service is satisfied, and service processing performance is improved.

In some implementations, the method further includes: receiving first information, where the first information includes a service identifier of a target service; determining a session identifier of a target session corresponding to the service identifier of the target service; and sending second information, where the second information includes the session identifier of the target session.

According to a fourth aspect, a local network accessing method is provided. The method includes: sending a trigger message to a terminal, where the trigger message is for triggering the terminal to establish a session; receiving a first message from the terminal, where the first message requests to establish a first session, and the first session is for the terminal to access a target local network; determining a target network access identifier based on the first message, where the target network access identifier indicates the target local network; determining a first SMF based on the target network access identifier; and sending the target network access identifier to the first SMF, where the target network access identifier is for the first SMF to determine a target UPF.

When an SMF has a limited service area, a session management function network element may actively trigger the terminal to initiate establishment of a session for accessing a local network, receive the first message from the terminal, determine the target network access identifier based on the first message, and then determine the first SMF based on the target network access identifier, to establish the first session. In this way, the terminal can access the local network by using the established first session, so that a requirement of a low-latency service is satisfied, and service processing performance is improved.

In some implementations, the first message includes a session identifier of a second session, the second session is for the terminal to access a central network, and the method further includes: obtaining at least one session identifier of at least one session and at least one network access identifier of at least one local network corresponding to the at least one session identifier of the at least one session; and the determining a target network access identifier based on the first message includes: determining, based on the session identifier of the second session, the target network access identifier corresponding to the session identifier of the second session.

The session management function network element may learn of, based on a preset mapping relationship, the target network access identifier corresponding to the session identifier of the second session. In this way, the terminal accesses the local network by using the target network access identifier, so that the requirement of the low-latency service is satisfied, and service processing performance is improved.

In some implementations, the method further includes: receiving a mapping relationship from a second SMF, where the second SMF is for the terminal to establish the second session.

In some implementations, the method further includes: receiving a first request, where the first request includes the target network access identifier; determining a session identifier of a target session corresponding to the target network access identifier; and sending a first response to a first network element, where the first response includes the session identifier of the target session; or sending second information to a second network element, where the second information includes the session identifier of the target session.

In some implementations, the first network element includes an SMF, and the second network element includes a terminal.

In some implementations, before the determining a session identifier of a target session corresponding to the target network access identifier, the method further includes: obtaining a correspondence between the target network access identifier and the session identifier of the target session.

According to a fifth aspect, a local network accessing method is provided. The method includes: receiving first information, where the first information includes a service identifier of a target service; determining a target network access identifier corresponding to the service identifier of the target service; and sending third information, where the third information includes the target network access identifier.

According to a sixth aspect, a local network accessing method is provided. The method includes: receiving first information, where the first information includes a service identifier of a target service; determining a session identifier of a target session corresponding to the service identifier of the target service; and sending second information, where the second information includes the session identifier of the target session.

In some implementations, the method further includes: obtaining a first correspondence, where the first correspondence includes a correspondence between a target network access identifier corresponding to the target service and the session identifier of the target session; and the determining a session identifier of a target session corresponding to the service identifier of the target service includes: determining, based on the first correspondence, the session identifier of the target session corresponding to the service identifier of the target service.

In some implementations, the determining a session identifier of a target session corresponding to the service identifier of the target service includes: determining a target network access identifier corresponding to the service identifier of the target service; sending a first request, where the first request requests the session identifier of the target session corresponding to the target network access identifier; and receiving a first response, where the first response includes the session identifier of the target session.

According to a seventh aspect, an edge application server EAS discovering method is provided. The method includes: receiving a discovery request from a first device, where the discovery request requests to discover an EAS, the discovery request includes a preset condition, and the first device is a session management function network element or a terminal; determining, based on the discovery request, at least one EAS that satisfies the preset condition; and sending a discovery response message to the first device, where the discovery response message includes an internet protocol IP address of the at least one EAS.

An AF receives the discovery request including the preset condition, determines, based on the discovery request, the at least one EAS that satisfies the preset condition, and feeds back, to the AF, the discovery response message including the IP address of the at least one EAS. This avoids discovering an EAS that does not satisfy a requirement, and improves effectiveness of EAS discovery.

In some implementations, the discovery request further includes at least one of an application identifier, a network access identifier list of a local network, or an EAS requirement.

In some implementations, the response message further includes a serving area, and the serving area is for the terminal to determine whether to re-initiate a discovery request.

The terminal may determine, based on the serving area after moving, whether an EAS request needs to be re-initiated, to improve service quality of serving an EAS.

According to an eighth aspect, an edge application server EAS discovering method is provided. The method includes: sending a discovery request, where the discovery request requests to discover an edge application server EAS, and the discovery request includes a preset condition; and receiving a discovery response message, where the discovery response message includes an internet protocol IP address of at least one EAS that satisfies the preset condition.

A first device sends the discovery request including the preset condition to an AF, so that the AF determines, based on the discovery request, the at least one EAS that satisfies the preset condition, and feeds back, to the AF, the discovery response message including the IP address of the at least one EAS. This avoids discovering an EAS that does not satisfy a requirement, and improves effectiveness of EAS discovery.

In some implementations, the discovery request further includes at least one of an application identifier, a network access identifier list of a local network, or an EAS requirement.

In some implementations, the method further includes: receiving parameter information from an AMF, where the parameter information indicates a first location of a terminal and the application identifier requested by the terminal; and determining, based on the parameter information and a network topology, a network access identifier list of a local network to which the terminal can be connected at the first location.

In some implementations, the method further includes: determining a target DNAI based on the IP address of the at least one EAS; and determining a breakout node based on the target DNAI, where the breakout node is configured to perform breakout access on a central network and access data of the local network.

In some implementations, the response message further includes a serving area, and the serving area is for the terminal to determine whether to re-initiate a discovery request.

The terminal may determine, based on the serving area after moving, whether an EAS request needs to be re-initiated, to improve service quality of serving an EAS.

According to a ninth aspect, a local network accessing apparatus is provided. The apparatus may be a terminal, or may be a chip in the terminal. The apparatus has a function of implementing the first aspect and the implementations. The function may be implemented by using hardware, or may be implemented by the hardware executing corresponding software. The hardware or the software includes one or more modules corresponding to the foregoing function.

In an embodiment, the apparatus includes a transceiver module and a processing module. The transceiver module may be, for example, at least one of a transceiver, a receiver, or a transmitter. The transceiver module may include a receiving module and a sending module. The transceiver module may include a radio frequency circuit or an antenna. The processing module may be a processor. Optionally, the apparatus further includes a storage module. The storage module may be, for example, a memory. When the storage module is included, the storage module is configured to store instructions. The processing module is connected to the storage module, and the processing module may execute the instructions stored in the storage module or instructions from another module, so that the apparatus performs the communication method according to the first aspect and the implementations. In this design, the apparatus may be the terminal.

In another design, when the apparatus is the chip, the chip includes a transceiver module and a processing module. The transceiver module may include a receiving module and a sending module. The transceiver module may be, for example, an input/output interface, a pin, or a circuit on the chip. The processing module may be, for example, a processor. The processing module may execute instructions, so that the chip in the terminal performs the communication method according to any one of the first aspect and the implementations. Optionally, the processing module may execute instructions in a storage module. The storage module may be a storage module inside the chip, for example, a register or a cache. The storage module may alternatively be located inside the communication device but outside the chip, for example, a read-only memory (ROM) or another type of static storage device that can store static information and instructions, or a random access memory (RAM).

The processor mentioned anywhere above may be a general-purpose central processing unit (CPU), a microprocessor, an application-specific integrated circuit (ASIC), or one or more integrated circuits configured to control program execution of the communication methods according to the foregoing aspects.

According to a tenth aspect, a local network accessing apparatus is provided. The apparatus may be an SMF, or may be a chip in the SMF. The apparatus has a function of implementing the second aspect and the implementations. The function may be implemented by using hardware, or may be implemented by the hardware executing corresponding software. The hardware or the software includes one or more modules corresponding to the foregoing function.

In a design, the apparatus includes a transceiver module and a processing module. The transceiver module may include a receiving module and a sending module. The transceiver module may be, for example, at least one of a transceiver, a receiver, or a transmitter. The transceiver module may include a radio frequency circuit or an antenna. The processing module may be a processor.

Optionally, the apparatus further includes a storage module. The storage module may be, for example, a memory. When the storage module is included, the storage module is configured to store instructions. The processing module is connected to the storage module, and the processing module may execute the instructions stored in the storage module or instructions from another module, so that the apparatus performs the method according to any one of the second aspect or the implementations of the second aspect.

In another design, when the apparatus is the chip, the chip includes a transceiver module and a processing module. The transceiver module may include a receiving module and a sending module. The transceiver module may be, for example, an input/output interface, a pin, or a circuit on the chip. The processing module may be, for example, a processor. The processing module may execute instructions, so that the chip in the SMF performs the communication method according to any one of the second aspect and the implementations.

Optionally, the processing module may execute instructions in a storage module. The storage module may be a storage module inside the chip, for example, a register or a cache. The storage module may alternatively be located inside the communication device but outside the chip, for example, a read-only memory (ROM) or another type of static storage device that can store static information and instructions, or a random access memory (RAM).

The processor mentioned anywhere above may be a general-purpose central processing unit (CPU), a microprocessor, an application-specific integrated circuit (ASIC), or one or more integrated circuits configured to control program execution of the communication methods according to the foregoing aspects.

According to an eleventh aspect, a local network accessing apparatus is provided. The apparatus may be an SMF, or may be a chip in the SMF. The apparatus has a function of implementing the second aspect, the third aspect, or the fourth aspect, and the implementations. The function may be implemented by using hardware, or may be implemented by the hardware executing corresponding software. The hardware or the software includes one or more modules corresponding to the foregoing function.

In a design, the apparatus includes a transceiver module and a processing module. The transceiver module may include a receiving module and a sending module. The transceiver module may be, for example, at least one of a transceiver, a receiver, or a transmitter. The transceiver module may include a radio frequency circuit or an antenna. The processing module may be a processor.

Optionally, the apparatus further includes a storage module. The storage module may be, for example, a memory. When the storage module is included, the storage module is configured to store instructions. The processing module is connected to the storage module, and the processing module may execute the instructions stored in the storage module or instructions from another module, so that the apparatus performs the method according to any one of the second aspect, the third aspect, the fourth aspect, or the implementations of the second aspect, the third aspect, or the fourth aspect.

In another design, when the apparatus is the chip, the chip includes a transceiver module and a processing module. The transceiver module may include a receiving module and a sending module. The transceiver module may be, for example, an input/output interface, a pin, or a circuit on the chip. The processing module may be, for example, a processor. The processing module may execute instructions, so that the chip in the SMF performs the communication method according to any one of the second aspect, the third aspect, the fourth aspect, and the implementations.

Optionally, the processing module may execute instructions in a storage module. The storage module may be a storage module inside the chip, for example, a register or a cache. The storage module may alternatively be located inside the communication device but outside the chip, for example, a read-only memory (ROM) or another type of static storage device that can store static information and instructions, or a random access memory (RAM).

The processor mentioned anywhere above may be a general-purpose central processing unit (CPU), a microprocessor, an application-specific integrated circuit (ASIC), or one or more integrated circuits configured to control program execution of the method according to the second aspect, the third aspect, or the fourth aspect.

According to a twelfth aspect, a local network accessing apparatus is provided. The apparatus may be an AF, or may be a chip in the AF. The apparatus has a function of implementing the fifth aspect and the implementations. The function may be implemented by using hardware, or may be implemented by the hardware executing corresponding software. The hardware or the software includes one or more modules corresponding to the foregoing function.

In a design, the apparatus includes a transceiver module and a processing module. The transceiver module may include a receiving module and a sending module. The transceiver module may be, for example, at least one of a transceiver, a receiver, or a transmitter. The transceiver module may include a radio frequency circuit or an antenna. The processing module may be a processor.

Optionally, the apparatus further includes a storage module. The storage module may be, for example, a memory. When the storage module is included, the storage module is configured to store instructions. The processing module is connected to the storage module, and the processing module may execute the instructions stored in the storage module or instructions from another module, so that the apparatus performs the method according to any one of the fifth aspect or the implementations of the fifth aspect.

In another design, when the apparatus is the chip, the chip includes a transceiver module and a processing module. The transceiver module may include a receiving module and a sending module. The transceiver module may be, for example, an input/output interface, a pin, or a circuit on the chip. The processing module may be, for example, a processor. The processing module may execute instructions, so that the chip in the AF performs the communication method according to any one of the fifth aspect and the implementations.

Optionally, the processing module may execute instructions in a storage module. The storage module may be a storage module inside the chip, for example, a register or a cache. The storage module may alternatively be located inside the communication device but outside the chip, for example, a read-only memory (ROM) or another type of static storage device that can store static information and instructions, or a random access memory (RAM).

The processor mentioned anywhere above may be a general-purpose central processing unit (CPU), a microprocessor, an application-specific integrated circuit (ASIC), or one or more integrated circuits configured to control program execution of the method according to the fifth aspect.

According to a thirteenth aspect, a local network accessing apparatus is provided. The apparatus may be a terminal or an SMF, or may be a chip in the terminal or the SMF. The apparatus has a function of implementing the sixth aspect and the implementations. The function may be implemented by using hardware, or may be implemented by the hardware executing corresponding software. The hardware or the software includes one or more modules corresponding to the foregoing function.

In a design, the apparatus includes a transceiver module and a processing module. The transceiver module may include a receiving module and a sending module. The transceiver module may be, for example, at least one of a transceiver, a receiver, or a transmitter. The transceiver module may include a radio frequency circuit or an antenna. The processing module may be a processor.

Optionally, the apparatus further includes a storage module. The storage module may be, for example, a memory. When the storage module is included, the storage module is configured to store instructions. The processing module is connected to the storage module, and the processing module may execute the instructions stored in the storage module or instructions from another module, so that the apparatus performs the method according to any one of the sixth aspect or the implementations of the sixth aspect.

In another design, when the apparatus is the chip, the chip includes a transceiver module and a processing module. The transceiver module may include a receiving module and a sending module. The transceiver module may be, for example, an input/output interface, a pin, or a circuit on the chip. The processing module may be, for example, a processor. The processing module may execute instructions, so that the chip in the terminal or the SMF performs the communication method according to any one of the sixth aspect and the implementations.

Optionally, the processing module may execute instructions in a storage module. The storage module may be a storage module inside the chip, for example, a register or a cache. The storage module may alternatively be located inside the communication device but outside the chip, for example, a read-only memory (ROM) or another type of static storage device that can store static information and instructions, or a random access memory (RAM).

The processor mentioned anywhere above may be a general-purpose central processing unit (CPU), a microprocessor, an application-specific integrated circuit (ASIC), or one or more integrated circuits configured to control program execution of the method according to the sixth aspect.

According to a fourteenth aspect, a computer storage medium is provided. The computer storage medium stores program code. The program code indicates instructions for performing the method according to any one of the first aspect to the sixth aspect and the implementations of the first aspect to the sixth aspect.

According to a fifteenth aspect, a computer program product including instructions is provided. When the computer program product runs on a computer, the computer is enabled to perform the method according to any one of the first aspect to the sixth aspect or the implementations of the first aspect to the sixth aspect.

According to a sixteenth aspect, a communication system is provided. The communication system includes an apparatus that has a function of implementing the method and the designs in the first aspect and a session management function network element.

According to a seventeenth aspect, a communication system is provided. The communication system includes an apparatus that has a function of implementing the method and the designs in the second aspect and an apparatus that has a function of implementing the method and the designs in the fourth aspect.

According to an eighteenth aspect, a communication system is provided. The communication system includes a terminal and an apparatus that has a function of implementing the method and the designs in the third aspect.

According to a nineteenth aspect, a communication system is provided. The communication system includes an apparatus that has a function of implementing the method and the designs in the fifth aspect and an apparatus that has a function of implementing the method and the designs in the sixth aspect.

Based on the foregoing technical solutions, when obtaining the first network access identifier indicating the first local network, the terminal may actively send the session establishment request to the session management function network element to request to establish the first session. The first session is for the terminal to access the first local network, and the session establishment request includes the first network access identifier. In other words, in embodiments of this application, the local network can be accessed, so that the requirement of the low-latency service can be satisfied, and service processing performance is improved.

DESCRIPTION OF EMBODIMENTS

Figures 1, 2:
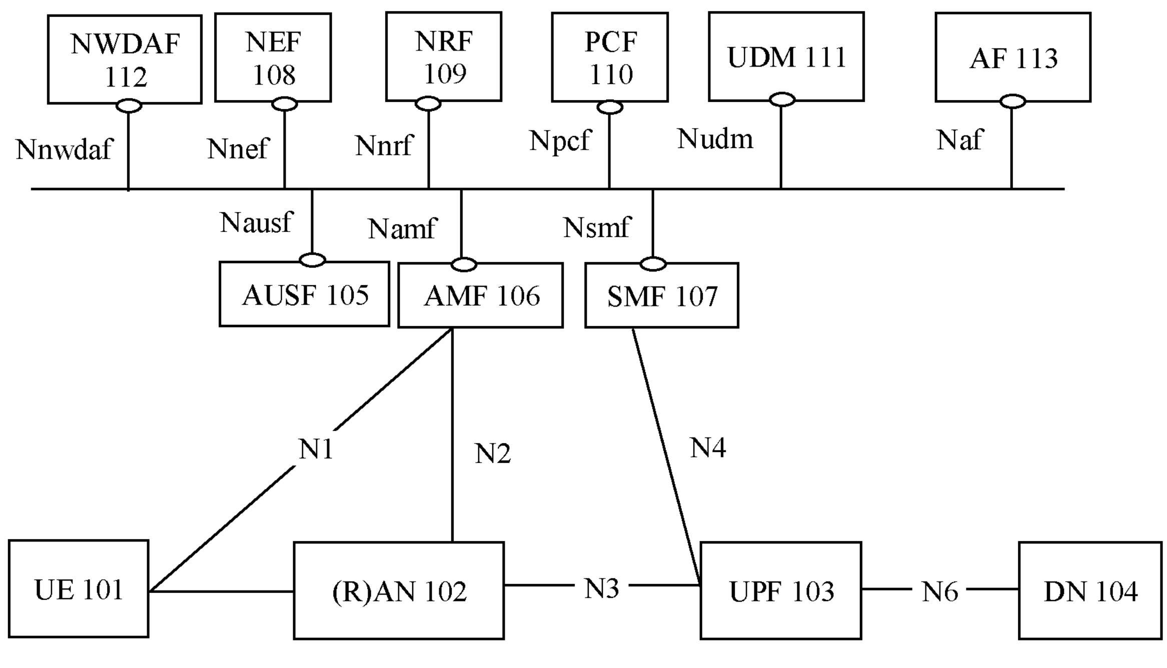
FIG. 1 is a schematic diagram of a network architecture according to an embodiment of this application.
FIG. 2 is a schematic diagram of another application architecture according to an embodiment of this application.

The following describes technical solutions in this application with reference to accompanying drawings.

A terminal in embodiments of this application may be a device having a wireless transceiver function, and may be referred to as a terminal, user equipment (UE), a mobile station (MS), a mobile terminal (MT), a vehicle-mounted terminal, a remote station, a remote terminal, or the like. A form of the terminal may be a mobile phone, a cellular phone, a cordless phone, a session initiation protocol (SIP) phone, a wearable device, a tablet (pad), a desktop computer, a notebook computer, a stand-alone computer, the vehicle-mounted terminal, a wireless local loop (WLL) station, a personal digital assistant (PDA), or the like. The terminal may be applied to the following scenarios: virtual reality (VR), augmented reality (AR), industrial control, self driving remote medical surgery, a smart grid, transportation safety, a smart city, a smart home, and the like. The terminal may be fixed or mobile. It should be noted that the terminal may support at least one wireless communication technology, for example, LTE, NR, or wideband code division multiple access (WCDMA).

In embodiments of this application, the terminal includes a hardware layer, an operating system layer running on the hardware layer, and an application layer running on the operating system layer. The hardware layer includes hardware such as a central processing unit (CPU), a memory management unit (MMU), and a memory (also referred to as a main memory). An operating system may be any one or more computer operating systems that implement service processing by using a process, for example, a Linux operating system, a Unix operating system, an Android operating system, an iOS operating system, or a windows operating system. The application layer includes applications such as a browser, an address book, word processing software, and instant communication software. In addition, a structure of an execution body of a method provided in embodiments of this application is not particularly limited in embodiments of this application provided that a program that records code of the method provided in embodiments of this application can be run to perform communication according to the method provided in embodiments of this application. For example, the execution body of the method provided in embodiments of this application may be a terminal, an access network device, or a function module that is in the terminal or the access network device and that can invoke and execute the program.

In addition, aspects or features of this application may be implemented as a method, an apparatus, or a product that uses standard programming and/or engineering technologies. For example, a computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

It may be understood that the access network device and the terminal may be deployed on land, and include an indoor or outdoor device, or a handheld or vehicle-mounted device; may be deployed on water; or may be deployed on an aircraft, a balloon, and a satellite in the air. Application scenarios of a radio access network device and the terminal are not limited in embodiments of this application.

FIG. 1 is a schematic diagram of a network architecture according to an embodiment of this application. A 5G network architecture is used as an example. The network architecture includes a terminal such as UE 101, a (radio) access network (radio access network, (R)AN) 102, a user plane function (UPF) network element 103, a DN network element 104, an authentication server function (AUSF) network element 105, an AMF network element 106, a session management function (SMF) network element 107, a network exposure function (NEF) network element 108, a network repository function (NRF) network element 109, a policy control function (PCF) network element 110, a unified data management (UDM) network element 111, a network data analytics function (NWDAF) network element 112, and an application function (AF) network element 113. The UPF network element 103, the DN network element 104, the AUSF network element 105, the AMF network element 106, the SMF network element 107, the NEF network element 108, the NRF network element 109, the policy control function (PCF) network element 110, the UDM network element 111, the NSSF network element 112, and the AF network element 113 are referred to as a UPF 103, a DN 104, an AUSF 105, an AMF 106, an SMF 107, an NEF 108, an NRF 109, a PCF 110, a UDM 111, an NWDAF 112, and an AF 113 for short below.

The terminal 101 mainly accesses a 5G network through a radio air interface, and obtains a service. The terminal interacts with the RAN through the air interface, and interacts with the AMF in a core network by using non-access stratum (NAS) signaling.

The RAN 102 is responsible for scheduling an air interface resource for the terminal to access the network and responsible for air interface connection management.

The UPF 103 is responsible for forwarding and receiving user data in the terminal. For example, the UPF may receive user data from a data network, and transmit the user data to the terminal via the access network device, and may further receive user data from the terminal via the access network device, and forward the user data to the data network. A transmission resource and a scheduling function that are for the UPF 103 to serve the terminal are managed and controlled by the SMF network element.

The DN 104 may be an internet, or may be an enterprise private network, for example, a carrier service, internet access, or a third-party service.

The AUSF 105 is a core network control plane network element, and is mainly responsible for authenticating and authorizing a user to ensure that the user is an authorized user.

The AMF 106 is a core network element, and is mainly responsible for a signaling processing part, for example, functions such as access control, mobility management, attachment and detachment, and gateway selection. In addition, when providing a service for a session in the terminal, the AMF 106 may further provide a control plane storage resource for the session, to store a session identifier, an SMF network element identifier associated with the session identifier, and the like.

The SMF 107 is responsible for user plane network element selection, user plane network element redirection, internet protocol (IP) address assignment, bearer establishment, modification, and release, and quality of service (QoS) control.

The NEF 108 is a core network control plane network element, and is configured to be responsible for exposing a mobile network capability.

The NRF 109 is a core network control plane network element, and is configured to be responsible for dynamic registration of a service capability of a network function and network function discovery.

The PCF 110 mainly supports providing of a unified policy framework to control network behavior, and providing of a policy rule for a control layer network function, and is responsible for obtaining user subscription information related to a policy decision.

The UDM 111 is a core network control plane network element, may be used for unified data management, and supports functions such as 3GPP authentication, user identity operation, permission granting, registration, and mobility management.

The NWDAF 112 is used as a network data analytics function entity, and provides network data collection and analysis functions that are based on technologies such as big data and artificial intelligence.

The AF 113 is configured to interact with a 3GPP core network to provide a service, to affect service flow routing, access network capability exposure, policy control, and the like.

It may be understood that in the network architecture, Nausf is a service-based interface presented by the AUSF 105, Namf is a service-based interface presented by the AMF 106, Nsmf is a service-based interface presented by the SMF 107, Nnef is a service-based interface presented by the NEF 108, Nnrf is a service-based interface presented by the NRF 109, Npcf is a service-based interface presented by the PCF 110, Nudm is a service-based interface presented by the UDM 111, Nnwdaf is a service-based interface presented by the NWDAF 112, and Naf is a service-based interface presented by the AF 113. N1 is a reference point between the UE 101 and the AMF 106. N2 is a reference point between the (R)AN 102 and the AMF 106, and is used for sending a non-access stratum (NAS) message and the like. N3 is a reference point between the (R)AN 102 and the UPF 103, and is used for transmitting user plane data and the like. N4 is a reference point between the SMF 107 and the UPF 103, and is used for transmitting information such as tunnel identification information of an N3 connection, data buffer indication information, and a downlink data notification message. An N6 interface is a reference point between the UPF 103 and the DN 104, and is used for transmitting user plane data and the like.

FIG. 2 is a schematic diagram of another application architecture (a mobile edge computing (MEC) architecture) according to an embodiment of this application. As shown in FIG. 2, the application architecture includes a terminal 210, an edge data network (EDN) 220, and an edge configuration server (ECS) 230. The EDN 220 includes an edge application 221 and an edge enabler server (EES) 222. The terminal includes an application client 211 and an edge enabler client (EEC) 212.

EDN 220:

A general understanding is as follows: An EDN corresponds to a data network, is a special local data network (local DN), includes an edge enabler function, may be identified by using a data network access identifier (DN access identifier, DNAI) and a data network name (DNN), and is a network logical concept. Another understanding of an EDN is as follows: The EDN is a peer concept of central cloud, may be understood as a local data center (that is, a geographical location concept), may be identified by using a DNAI, and may include multiple local data networks (local DNs).

Edge Application 221:

An edge application is an application deployed in an edge data network. The edge application may also be referred to as an "application instance", and is an instance that is of a server application (for example, social media software, augmented reality (AR), or virtual reality (VR)) and that is deployed and runs on the EDN. One application may have one or more EASs deployed in one or more EDNs. EASs deployed and running in different EDNs may be considered as different EASs of the application. The EASs may share a domain name, or may use a domain name different from that of an application deployed on cloud. The domain name may be a fully qualified domain name (FQDN).

It may be understood that the EAS may also be referred to as an edge application (server), an application instance, an edge application instance, a mobile edge computing (MEC) application (server), an EAS function, or the like.

Application Client 211:

An application client is a peer entity of the edge application on a UE side. The application client is for an application user to obtain an application service from an application server. The application client is a client program of an application on a terminal side. The application client may be connected to an application server on cloud to obtain the application service, or may be connected to the EAS deployed and running in the one or more EDNs to obtain the application service.

EES 222:

An EES is deployed in an EDN, and may provide some enabler capabilities for an application instance deployed in the EDN; may better support deployment of an application in MEC; may support registration of the edge application, authentication and authorization on UE, and provide IP address information of the application instance for the UE, and so on; or may further support obtaining of an identifier and IP address information of the application instance, and further send the identifier and the IP address information of the application instance to an edge data network configuration server. Generally, an EAS is registered with an EES, or information about an EAS is configured on an EES by using a management system. The EES is referred to as an EES associated with the EAS. The EES controls/manages the EAS registered with/configured on the EES.

It may be understood that the identifier of the application instance may include an FQDN.

EEC 212:

An EEC is a peer entity of an EES on the UE side. The EEC is configured to: register information about the EEC and information about the application client with the EES, perform security authentication and authorization, obtain an IP address of an EAS from the EES, and provide an edge computing enabler capability for the application client. For example, an EAS discovery server returns the IP address of the EAS to the application client. The EEC may be a sub-function module implemented inside the application client (AC), a module integrated in an operating system, or an independent application.

ECS 230:

An ECS is responsible for configuration of the EDN, for example, providing information about the EES for the UE. The ECS may further directly provide information about the application instance for the UE, and interact with a domain name server (DNS) of an application to obtain the information about the application instance, and may further obtain the application instance and the IP address information from another function entity and store the application instance and the IP address information.

Figure 3:
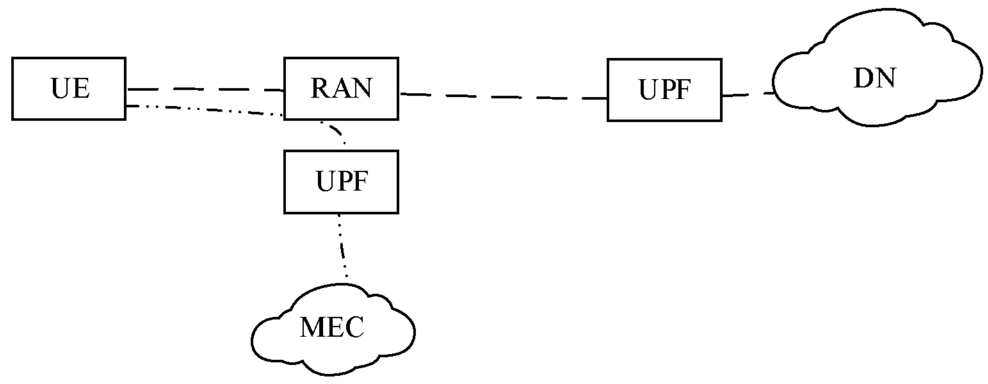
FIG. 3 is a schematic diagram of a comparison between a 5G application architecture and a MEC architecture.

FIG. 3 is a schematic diagram of a comparison between a 5G application architecture and a MEC architecture. Compared with a DN in the 5G application architecture, a local DN in the MEC architecture can provide a service for a user in an edge area closer to a terminal. In other words, a service, a service processing function, and a resource scheduling function are deployed in an edge network close to the terminal, to provide low-latency service experience. For example, as shown in FIG. 3, MEC is deployed at a local UPF (namely, a local UPF), and the DN is deployed at a remote UPF. Compared with a path for UE to access the DN, a path for the UE to access a MEC platform is greatly shortened. In other words, a MEC technology can provide a low-latency service for a user.

Figure 4:
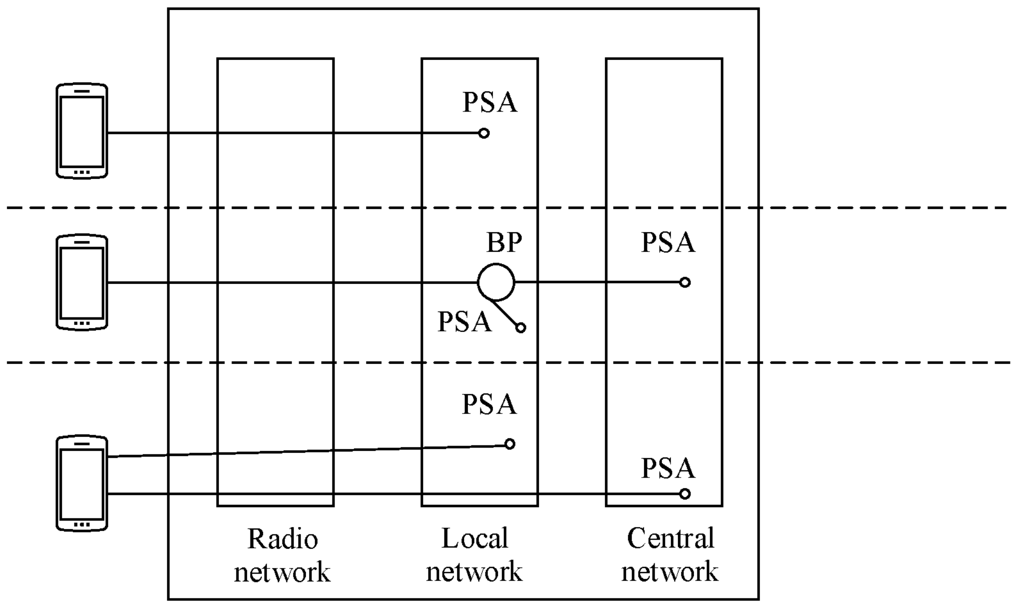
FIG. 4 is a schematic diagram of a service processing model according to an embodiment of this application.

FIG. 4 is a schematic diagram of a service processing model according to an embodiment of this application. Service processing may be performed by using three connectivity models shown in FIG. 4.

Connectivity Model 1:

Distributed anchor point: Services are deployed in an edge area in a distributed manner, and are accessed through a PDU session anchor (PSA) in the edge area. When UE moves, the anchor can be changed to optimize a path. For example, the UE establishes a session whose SSC mode is an SSC mode 2 or an SSC mode 3. When the path is not optimal, a session is created to change the anchor, to optimize the path.

Connectivity Model 2:

Breakout: A service is deployed in both an edge area and a central area. Service breakout to the edge area is performed in a breakout manner by inserting a local anchor, to implement access to an edge service.

It may be understood that a breakout point may be an uplink classifier (ULCL) or a branching point (BP).

Connectivity Model 3:

Multiple sessions: A service is deployed in both an edge area and a central area. Access to an edge service is implemented in a multi-session manner by establishing a session for accessing the edge service.

The following briefly describes terms in this application.

1. Session:

In a 5G network, a terminal may access a data network by creating a protocol data unit (PDU) session. For example, the terminal may access different data networks by creating multiple PDU sessions. A session type may include an IPV4 type, an IPV6 type, an IPV4IPv6 type, an ethernet type, an unstructured type, or the like.

A session continuity mode may include a session and service continuity (SSC) mode (mode) 1, an SSC mode 2, an SSC mode 3, or the like. The SSC mode 1 may be that the network maintains continuity of a service provided for the terminal. The SSC mode 2 may be that the network releases a service connection to the terminal and a corresponding PDU session. The SSC mode 3 may be that a new PDU session connection is established before an original connection is terminated.

2. UE Route Selection Policy (URSP):

The URSP may include a correspondence between an application identifier (app ID) and an application requirement. An application may be an internet of vehicles application, or may be an internet of things application. This is not limited. The application identifier may alternatively be represented by using an IP 5 tuple, an IP 3 tuple, or the like. In addition, the application requirement in the correspondence may be a subscription application requirement of a terminal device. The application requirement may be a DNN, S-NSSAI, an SSC mode, or the like.

According to the URSP, the terminal may determine a routing path of an application data flow, for example, determine a PDU session to which the application data flow is routed. When a session attribute of a PDU session is consistent with the application requirement of the application, the terminal may transmit data of the application by using the PDU session. When a session attribute of a PDU session is inconsistent with the application requirement of the application, the terminal may initiate a new PDU session, to establish a PDU session that satisfies the application requirement of the application.

The URSP may be preconfigured in the terminal, or may be sent by a PCF to the terminal via an AMF. The terminal may preferentially select a URSP delivered by a network device.

3. Domain Name Query:

In a network access process, a terminal first needs to determine an IP address corresponding to a domain name of a to-be-accessed service, to send a data packet of the to-be-accessed service. This operation requires the terminal to query a domain name system (DNS) server. A DNS is a host information database, and provides mapping and conversion between a domain name and an internet protocol address. For example, UE may resolve the domain name into a corresponding IP address by using the DNS server, so that the UE accesses a service. A correspondence between the domain name and the IP address may be referred to as a DNS record or a resource record.

a. The terminal starts an application (APP), and initiates a session establishment procedure or reuses an existing session of the UE, to establish a user plane connection between the terminal and a UPF. In addition, in a session establishment process, an SMF may send a DNS server address to the terminal.

It may be understood that different applications correspond to different services. The application in embodiments of this application may be QQ, WeChat, Fetion, mobile phone securities, mobile phone browsing, or file downloading. This is not limited in this application.

b. The terminal determines whether there is a DNS record related to a domain name of the APP.

For example, if the terminal stores the DNS record of the APP, the terminal may determine, based on the DNS record, an IP address corresponding to the domain name, and use the IP address as a destination IP address of a service.

If the terminal does not store the DNS record of the APP, the terminal may initiate a DNS query process. The terminal sends a DNS request message to the DNS server, where the DNS query message carries the domain name of the service. The wording "request" in a message name can be renamed as "query".

It may be understood that the DNS query message may be sent by the UE to the DNS server through the user plane connection between the UE and the UPF.

c. The DNS server receives the DNS query message, queries the database to obtain the IP address corresponding to the domain name, and returns a DNS response message to the terminal, where the DNS response message carries the IP address corresponding to the domain name and time to live (TTL).

It may be understood that the TTL represents time for which the DNS record may be cached. For example, the time to live is represented by using four bytes, where a value "0" indicates that the DNS record cannot be cached.

After the MEC architecture is introduced, how the terminal accesses the local DN in the MEC architecture to satisfy a requirement of a low-latency service needs to be urgently resolved.

Figure 5:
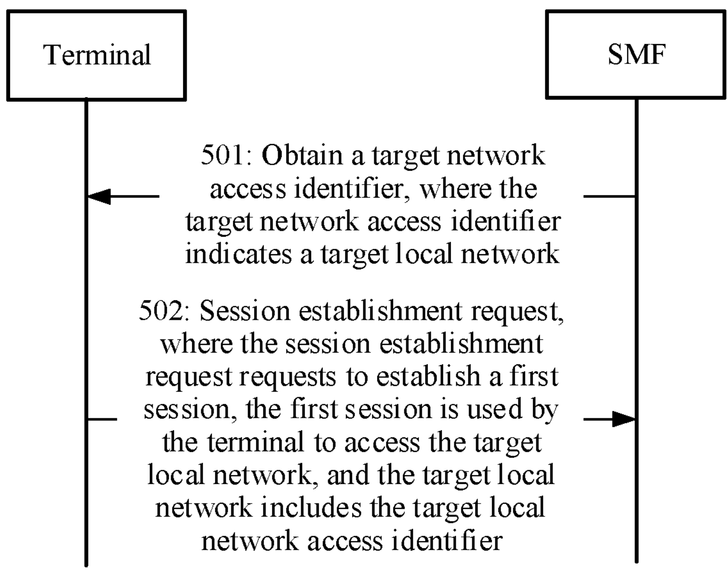
FIG. 5 is a schematic flowchart of a local network accessing method according to an embodiment of this application.

FIG. 5 is a schematic flowchart of a local network accessing method according to an embodiment of this application.

501: A terminal obtains a first network access identifier, where the first network access identifier indicates a first local network.

A system may include one or more local networks, and different local networks are identified by using different data network access identifiers (DN access identifiers, DNAIs). The local network may be the local DN in the MEC architecture shown in FIG. 3.

It may be understood that the terminal may actively obtain the first network access identifier, or may passively receive the first network access identifier. For example, the active obtaining may be as follows: The terminal first sends a request to another device to request to obtain the first network access identifier, and then obtains the first network access identifier from a received response message of the request. The passive receiving may be as follows: The terminal directly receives the first network access identifier sent by another device periodically or temporarily.

It may be further understood that, before the terminal performs step 501, there may be a session connection on the terminal, or there may be no session connection on the terminal. For example, the session connection before the terminal performs step 501 may be a session connection of a second session, where the second session may be for the terminal to access a central network. It should be noted that, in this application, it is assumed that a session attribute of the second session for accessing the central network is the same as that of a first session for accessing the local network. The session attribute may be an SSC mode, a DNN, S-NSSAI, or the like. For example, as shown in FIG. 3, a session connection of the first session is a session connection from the UE, a RAN, and the UPF to the MEC successively, and the session connection of the second session is a session connection from the UE, the RAN, and the UPF to the DN successively. In addition, in embodiments of this application, the accessing the central network may be understood as that a service needs to be processed through the central network, and the accessing the local network may be understood as that a service needs to be processed through the MEC.

It may be further understood that the session connection in embodiments of this application may be a user plane connection, a control plane connection, or a user plane connection and a control plane connection. This is not limited in this application.

In an embodiment, before step 501, the terminal may first obtain a first mapping relationship, where the first mapping relationship is a mapping relationship between at least one service and at least one network access identifier. In this way, step 501 may be that the terminal determines, based on the first mapping relationship and a first service, the first network access identifier corresponding to the first service.

After obtaining the first mapping relationship, the terminal may determine, based on the first mapping relationship, a network access identifier corresponding to any service. For example, a network access identifier corresponding to the first service may be determined based on the first mapping relationship and the first service. In this embodiment of this application, the terminal may use the network access identifier corresponding to the first service as the first network access identifier.

It may be understood that, that the at least one service corresponds to the at least one network access identifier may be as follows: One service corresponds to one network access identifier, one service corresponds to multiple network access identifiers, or multiple services correspond to one network access identifier. This is not limited in this application.

It may be further understood that the terminal may directly obtain the at least one service and the at least one network access identifier corresponding to the at least one service. For ease of description, in the following embodiment, an example in which the terminal obtains the first mapping relationship is used for description. However, this application is not limited thereto.

For example, the mapping relationship between the at least one service and the at least one network access identifier may be shown in the following Table 1. If the terminal accesses a service 1, a DNAI list corresponding to the service 1 is {DNAI 1, DNAI 3}. That is, a network corresponding to the DNAI list can provide the service 1 for the terminal. The service 1 may also be denoted as an EAS 1.

TABLE 1

| First mapping relationship form 1 | |
|---|---|
| Service 1 | DNAI 1 and DNAI 3 |
| Service 2 | DNAI 2, DNAI 3, and DNAI 4 |

It may be understood that the first mapping relationship may alternatively be represented in a form of Table 2. A network corresponding to the DNAI 1 can provide the service 1, the service 2, and a service 3, a network corresponding to the DNAI 2 can provide a service 4 and a service 5, a network corresponding to the DNAI 3 can provide the service 4 and a service 6, and a network corresponding to the DNAI 4 can provide a service 7 and a service 8.

TABLE 2

| First mapping relationship form 2 | |
|---|---|
| DNAI 1 | EAS 1, EAS 2, and EAS 3 |
| DNAI 2 | EAS 4 and EAS 5 |
| DNAI 3 | EAS 4 and EAS 6 |
| DNAI 4 | EAS 7 and EAS 8 |

It may be understood that one service may correspond to one or more network access identifiers. This is not limited in this application. In the first mapping relationship, if the first service corresponds to multiple network access identifiers, the first network access identifier may be any one of the multiple network access identifier(s) corresponding to the first service.

It may be further understood that the terminal may determine, only when starting an application (APP) (namely, the first service), the network access identifier corresponding to the first service.

Optionally, the terminal may obtain the first mapping relationship from a registration accept message from an access and mobility management function. For example, the terminal receives the registration accept message from the access and mobility management function, where the registration accept message includes the first mapping relationship.

Optionally, the terminal may obtain the first mapping relationship from a configuration update command message from an access and mobility management function. For example, the terminal receives the configuration update command message from the access and mobility management function, where the configuration update command message includes the first mapping relationship.

The configuration update command message may be sent by a mobility management function such as the access and mobility management function to the terminal in a terminal configuration update procedure after a registration procedure. For example, the configuration update command message is a UE configuration update (UCU) message.

Optionally, the first mapping relationship may alternatively be configured by the terminal. That is, the terminal locally configures the first mapping relationship.

In another embodiment, before step 501, the terminal may first obtain a second mapping relationship, where the second mapping relationship is a mapping relationship between at least one location of the terminal and at least one network access identifier. In this way, step 501 may be that the terminal determines the first network access identifier based on the second mapping relationship and a first location of the terminal.

There is a mapping relationship between the location of the terminal and the network access identifier. In other words, different locations of the terminal may correspond to different network access identifiers. In this way, the terminal may obtain, based on the second mapping relationship, a network access identifier corresponding to any location. In this embodiment of this application, the terminal may use a network access identifier corresponding to the first location as the first network access identifier. In other words, when the terminal is at the first location, the established first session may be for sending various services.

It may be understood that, that the at least one location corresponds to the at least one network access identifier may be as follows: One location corresponds to one network access identifier, one location corresponds to multiple network access identifiers, or multiple locations correspond to one network access identifier. This is not limited in this application.

It may be further understood that the terminal may directly obtain the at least one location and the at least one network access identifier corresponding to the at least one location. For ease of description, in the following embodiment, an example in which the terminal obtains the second mapping relationship is used for description. However, this application is not limited thereto.

For example, the second mapping relationship between the at least one location and the at least one network access identifier may be shown in the following Table 3. If a current location of the terminal is a location 1, a DNAI list is {DNAI 1, DNAI 2}. That is, a network corresponding to the DNAI list is a local network that can provide a service for the terminal.

TABLE 3

| Second mapping relationship | |
|---|---|
| Location 1 | DNAI 1 and DNAI 2 |
| Location 2 | DNAI 1, DNAI 3, and DNAI 4 |

It may be understood that one location of the terminal may correspond to one or more network access identifiers. This is not limited in this application. In the second mapping relationship, if the first location corresponds to multiple network access identifiers, the first network access identifier may be any one of the multiple network access identifier(s) corresponding to the first location.

It may be understood that the second mapping relationship may be generated by the terminal, or may be obtained from a core network in a session establishment process.

Optionally, the terminal may further determine a final DNAI based on a load status of an EAS. For example, because the DNAI list corresponding to the location 1 is {DNAI 1, DNAI 2}, the terminal may select the DNAI 1 as the final DNAI with reference to the load status of the EAS. In other words, different DNAIs may be associated with load of the EAS. In this way, the terminal may select a DNAI corresponding to an EAS having no load, or may select a DNAI corresponding to an EAS having a load alarm.

It may be understood that, how the terminal obtains the load status of the EAS is not limited in this application.

Optionally, the terminal may alternatively determine the first network access identifier based on a first mapping relationship, a second mapping relationship, a first location, and a first service.

The first mapping relationship is a mapping relationship between at least one service and at least one network access identifier, and the second mapping relationship is a mapping relationship between at least one location and at least one network access identifier. In this way, the terminal can determine, based on the first service and the first mapping relationship, network access identifier(s) corresponding to the first service, and then determine, based on the first location and the second mapping relationship, network access identifier(s) corresponding to the first location. Then, the terminal may use a same network access identifier in the network access identifier(s) corresponding to the first service and the network access identifier(s) corresponding to the first location as the first network access identifier. In other words, at the first location, the first service may be transmitted by using the first session.

It should be noted that the terminal may alternatively determine the first network access identifier in the following manner: The terminal determines, based on the first service and the first mapping relationship, a network access identifier corresponding to the first service, and then the terminal determines the first network access identifier based on the determined network access identifier corresponding to the first service, the first location, and the second mapping relationship.

It should be noted that the terminal may alternatively determine the first network access identifier in the following manner: The terminal determines, based on the first location and the second mapping relationship, a network access identifier corresponding to the first location, and then the terminal determines the first network access identifier based on the determined network access identifier corresponding to the first location, the first service, and the first mapping relationship.

In still another embodiment, before step 501, the terminal may first obtain at least one network access identifier corresponding to a first location of the terminal. In this way, step 501 may be that the terminal selects the first network access identifier from the at least one network access identifier.

The terminal may actively obtain or passively receive the at least one network access identifier corresponding to the first location. For example, the terminal may receive, from a session management function network element, the at least one network access identifier corresponding to the first location.

It may be understood that the at least one network access identifier may be regarded as a data network access identifier list (DNAI list).

Optionally, the terminal may further select the first network access identifier from the at least one network access identifier based on a first service and a first mapping relationship.

The terminal may further determine, based on the first mapping relationship, network access identifier(s) corresponding to the first service. In this way, the terminal uses a same network access identifier in the network access identifier(s) corresponding to the first service and the at least one network access identifier as the first network access identifier.

502: The terminal sends a session establishment request to the session management function network element, where the session establishment request requests to establish the first session, the first session is for the terminal to access the first local network, and the session establishment request includes the first network access identifier.

After obtaining the first network access identifier, the terminal may actively send the session establishment request to the session management function network element.

It may be understood that the terminal may send an AS message to an access network device, where the AS message includes a NAS message, and the NAS message carries a session identifier and the session establishment request. The access network device sends an N2 message to the access and mobility management network element, where the N2 message includes the session identifier and the session establishment request. The access and mobility management network element sends the session establishment request to the session management function network element.

It should be noted that the first network access identifier may be included in the NAS message. In this case, the NAS message includes the session identifier, the first network access identifier, and the session establishment request.

It may be further understood that the session management function network element in this embodiment of this application may be an SMF, but is not limited thereto. For ease of description, the SMF is used as an example for description in the following embodiment.

Optionally, after step 502, when starting a new APP, that is, processing a new service (which is referred to as a "second service" below), the terminal may first determine a network access identifier corresponding to the second service. For a method for determining, by the terminal, the network access identifier corresponding to the second service, refer to the descriptions in step 501. Details are not described herein again.

It is assumed that an application requirement of the second service is the same as that of the first service. That is, based on a conventional technology, the terminal may reuse the first session to transmit the second service. According to the foregoing descriptions, the first session is a session for accessing the local network, where the local network may be represented by using the first network access identifier. The local network may be able to provide only limited services. For example, only the first service and a third service are deployed in the local network. In this case, based on the conventional technology, a problem occurs when the terminal reuses the first session to transmit the second service. In this application, the problem is resolved in the following manner.

The terminal determines whether the network access identifier corresponding to the second service is the same as the first network access identifier, and sends the second service.

A manner in which the terminal sends the second service when the network access identifier corresponding to the second service is the same as the first network access identifier may be different from a manner in which the terminal sends the second service when the network access identifier corresponding to the second service is different from the first network access identifier. It may be understood that, that the terminal sends the second service may be understood as that the terminal transmits a packet of the second service.

For example, if the network access identifier corresponding to the second service is the same as the first network access identifier, the terminal may send the second service by using the first session.

For another example, if the network access identifier corresponding to the second service is different from the first network access identifier, the terminal may send the second service by using the second session, where the second session is for the terminal to access the central network.

For another example, if the network access identifier corresponding to the second service is different from the first network access identifier, the terminal may send the second service by using the third session, where a session connection of the third session may be a session connection that is for accessing the local network and that is re-established by the terminal for the second service.

It should be noted that the terminal may alternatively be unable to determine the network access identifier corresponding to the second service. For example, when the second service is deployed in the central network, the first mapping relationship stored by the terminal does not include the second service and the corresponding network access identifier. In this case, the terminal may transmit the packet of the second service by using the second session, where the second session is a session for accessing the central network. As described above, the second session is established before the first session. When the terminal does not establish the second session before establishing the first session, the terminal may create a session to transmit the packet of the second service, where the created session is a session for accessing the central network.

Optionally, that the terminal sends a service to the local network may be: first receiving an IP address of an EAS in the first local network, and sending the service to the EAS in the first local network based on the IP address of the EAS.

It may be understood that the service may be the foregoing first service, or may be the foregoing second service.

It may be further understood that the IP address of the EAS may be carried in a session response message, may be separately sent, or may be carried in another message. This is not limited in this application.

Optionally, that the terminal obtains an IP address of an EAS may be as follows: The terminal sends a DNS request message to a DNS server, where the DNS request message includes a domain name of the first service; and the DNS server determines the corresponding IP address of the EAS based on the domain name of the first service, and sends a DNS response message to the terminal, where the DNS response message includes the IP address of the EAS.

The terminal may send the DNS query message to the DNS server on a user plane connection of the first session, where the DNS query message includes an APP FQDN of a to-be-sent service (where for example, the APP FQDN is the domain name of the first service). The DNS server receives the DNS query message, and queries a database to obtain an IP address corresponding to the APP FQDN. The DNS server returns the DNS response message to the terminal, where the DNS response message includes the IP address corresponding to the APP FQDN.

Similarly, the terminal may also query for an IP address that is of an EAS and that corresponds to the second service or another service.

Optionally, the terminal may alternatively obtain an IP address of an EAS from the SMF.

It may be understood that DNS servers in this embodiment of this application may be deployed in a distributed manner, or may be deployed in a centralized manner.

Optionally, the terminal may further receive a serving area identifier of the EAS; and when the terminal moves out of a serving area indicated by the serving area identifier, send a session modification request to the session management function network element, to request to change a session connection.

It may be understood that the serving area identifier that is of the EAS and that is received by the terminal may be carried in the session response message, may be separately sent, or may be carried in another message. This is not limited in this application.

In the embodiment in FIG. 5, the terminal triggers a procedure of actively creating the session, to create the first session to access the local network. This is applicable to a multi-session scenario (that is, the connectivity model 3) in FIG. 4. Optionally, the terminal may alternatively actively trigger a procedure of modifying an existing session to access the local network by using a modified session. This embodiment is applicable to a breakout scenario (that is, the connectivity model 2) in FIG. 4.

Figure 6:
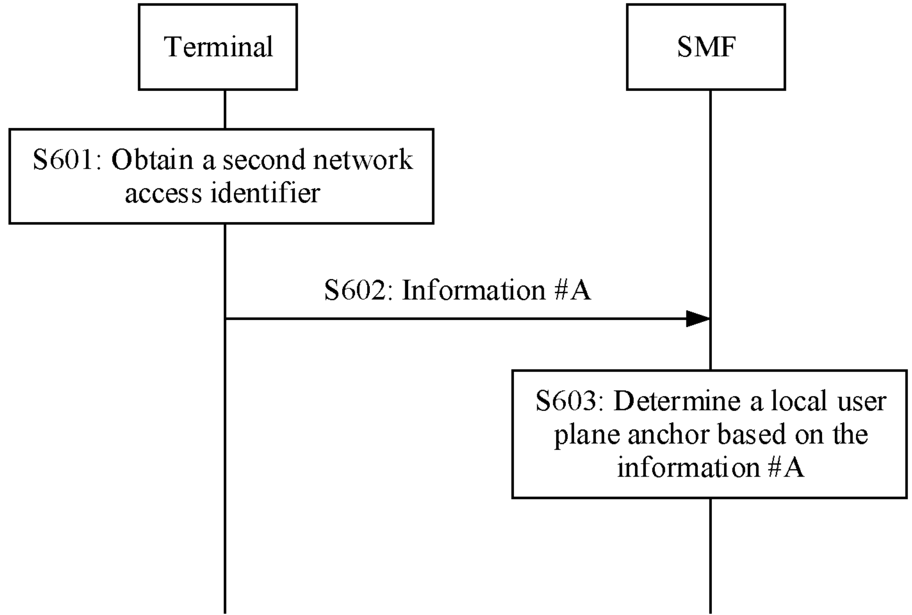
FIG. 6 is a schematic flowchart of a local network accessing method according to another embodiment of this application.

The following uses an example in which the existing session is the third session, and describes, with reference to FIG. 6, a method for actively triggering, by the terminal, the procedure of modifying the existing session to access the local network. It should be understood that the third session may be for transmitting and processing a service of an EES, a service of an EAS, and/or a service of an ECS.

It should be noted that the foregoing existing session may be for the terminal to access the central network, or may be for the terminal to access the local network. This is not limited in this application.

S601: A terminal obtains a second network access identifier, where the second network access identifier indicates a second local network.

It should be understood that a system may include one or more local networks. Different local networks are identified by using different data network access identifiers (DN access identifiers, DNAIs). Each local network has a corresponding service area. The service area may be understood as a service area of an EAS, or may be understood as a service area of an EES or a service area of an ECS. The second network access identifier corresponds to a current location of the terminal. In other words, the terminal is currently in a service area of the second local network.

It should be further understood that, the terminal may actively obtain the second network access identifier, or may passively receive the second network access identifier. Alternatively, information about the EES, the ECS, or the EAS and information about the service area corresponding to the EES, the ECS, or the EAS are pre-configured for the terminal, where the information about the service area corresponding to the EES, the ECS, or the EAS may be represented by at least one DNAI, and the at least one DNAI includes the second network access identifier.

In a implementation, a manner in which the terminal actively obtains the second network access identifier may be as follows: The terminal first sends a request to another device to request to obtain the information related to the EES/ECS/EAS, and then obtains, from a received response message of the request, the information about the EES, the ECS, or the EAS and the information about the service area corresponding to the EES, the ECS, or the EAS, where the corresponding service area includes a service area corresponding to the second network access identifier. It may also be understood as that the DNAI corresponding to the service area of the EES, the ECS, or the EAS includes the second network access identifier.

By way of example but not limitation, the terminal (or the EEC) sends a request to a network side (for example, the ECS or the EES) to request to obtain the information related to the EES/ECS/EAS and the information about the service area corresponding to the EES/ECS/EAS. A response message that is of the request and that is received by the terminal includes the information related to the EES/ECS/EAS and the information about the service area corresponding to the EES/ECS/EAS, where the information about the service area corresponding to the EES, the ECS, or the EAS may be represented by the at least one DNAI, and the at least one DNAI includes the second network access identifier.

In an implementation, that the terminal passively receives the second network access identifier may be that the terminal directly receives the information related to the EES/ECS/EAS and the information about the service area corresponding to the EES/ECS/EAS that are periodically or temporarily sent by another device.

It should be noted that a service area of a network access identifier (which may be referred to as a third network access identifier) corresponding to an existing session (namely, a third session) actively modified by the terminal is different from the service area of the second network access identifier. It may be understood as that a service area of a third local network corresponding to the third network access identifier is different from the service area of the second local network corresponding to the second network access identifier, and the terminal is currently in the service area of the second local network. It may be understood that the current location of the terminal may be a location to which the terminal moves. The foregoing descriptions may alternatively be understood as follows: The terminal is in the service area of the third local network before movement, and the terminal is in the service area of the second local network after the movement.

In an embodiment, before step 601, the terminal may first obtain a first mapping relationship, where the first mapping relationship is a mapping relationship between at least one service and at least one network access identifier. For descriptions of the first mapping relationship herein, refer to the embodiment corresponding to FIG. 5. Details are not described herein again.

In another embodiment, before step 601, the terminal may first obtain a second mapping relationship, where the second mapping relationship is a mapping relationship between at least one location of the terminal and at least one network access identifier. For descriptions of the second mapping relationship herein, also refer to the embodiment corresponding to FIG. 5. Details are not described herein again.

Optionally, the terminal may alternatively determine the second network access identifier based on a first mapping relationship and a second service, or a second mapping relationship and a second location, where the second location is the current location of the terminal, and the second service is a service corresponding to the current location of the terminal. It may be understood that the current location of the terminal may be the location to which the terminal moves.

S602: The terminal sends information #A to an SMF, where the information #A requests to modify the third session.

In an implementation, the terminal sends a PDU session modification request (namely, the information #A) to the SMF, where the request information requests to modify the third session. In other words, the request information requests to perform local breakout on the third session. The request information includes a session identifier (which may be denoted as a session 3) of the third session and the second network access identifier, where the session identifier of the third session is for determining a session that is modified, and the second network access identifier is for determining a local user plane anchor corresponding to the second local network. It should be noted that the information #A may alternatively be a NAS message sent by the terminal to an AMF, and includes a session identifier of the third session, the second network access identifier, and a PDU session modification request.

Optionally, the information #A further includes service information, and the service information indicates a service on which local breakout needs to be performed.

Optionally, the terminal may determine the service information based on the information that is related to the EES/ECS/EAS and that is obtained in step S601 and location information of UE or the terminal. For example, the terminal obtains identification information of an EAS 1, identification information of an EAS 2, information about a service area corresponding to the EAS 1, and information about a service area corresponding to the EAS 2. The terminal determines, based on the location information of the terminal, that the terminal is in both the service area of the EAS 1 and the service area of the EAS 2 before movement, and the terminal is still in the service area of the EAS 1 but is not in the service area of the EAS 2 after the movement. In this case, the service information included in the information #A may be service information of the EAS 2. It should be understood that service information of the EES/ECS/EAS may be understood as identification information, for example, an IP 5 tuple, of the EES/ECS/EAS.

S603: The SMF determines a local user plane anchor.

In an implementation, the information #A received by the SMF includes the second network access identifier and a session identifier, the SMF determines, based on the session identifier, a session that needs to be modified, and the SMF determines, based on the second network access identifier, the local user plane anchor corresponding to the second local network. Optionally, the SMF further determines, based on the second network access identifier, a breakout point corresponding to the second local network.

Optionally, when the information #A includes the service information, the SMF may further perform, based on the service information, local breakout on the service corresponding to the service information.

In the foregoing embodiment, the terminal actively triggers a procedure of modifying the existing session. In another embodiment, a network side may alternatively trigger a procedure of modifying an existing session. For example, an SMF triggers the procedure of modifying the existing session. For example, a process in which the SMF triggers the procedure of modifying the existing session may be as follows: The SMF obtains information #B from an EAS (which may alternatively be an EES or an ECS), the SMF determines, based on the obtained information #B, a network access identifier corresponding to a current location of a terminal and a session identifier of the existing session of the terminal, the SMF determines, based on the session identifier, a session that needs to be modified, and the SMF determines, based on the network access identifier, a breakout point and a local user plane anchor that correspond to the network access identifier.

It should be noted that the information #B may include the location information of the terminal, a corresponding local network access identifier, service information, information about the existing session of the terminal, and the like. It should be understood that the SMF only needs to be able to determine, based on the information #B, the network access identifier corresponding to the current location of the terminal and the session identifier of the existing session of the terminal. This is not limited in this application.

Optionally, an SMF may alternatively obtain service information of the terminal from the EAS (which may alternatively be the EES or the ECS), and perform, based on the service information, local breakout on a service corresponding to the service information. In the foregoing embodiment, the terminal actively initiates a procedure of creating a session. In another implementation, an SMF may alternatively trigger a terminal to create a session. The following describes this implementation with reference to FIG. 7.

Figure 7:
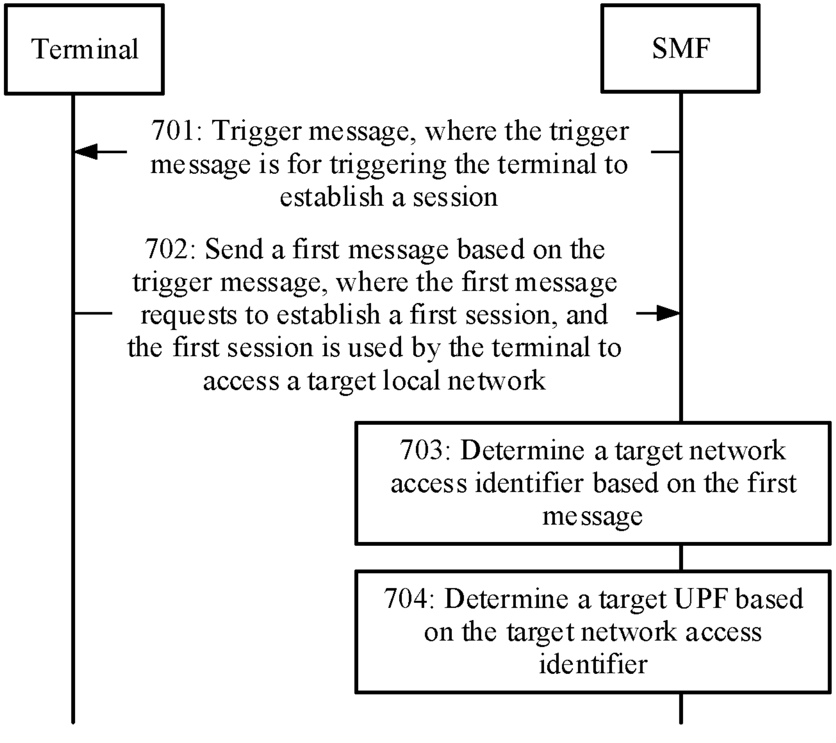
FIG. 7 is a schematic flowchart of a local network accessing method according to still another embodiment of this application.

FIG. 7 is a schematic flowchart of a local network accessing method according to an embodiment of this application.

701: A terminal receives a trigger message sent by a session management function network element, where the trigger message is for triggering the terminal to establish a session. Accordingly, the session management function network element sends the trigger message to the terminal.

The session management function network element sends the trigger message to the terminal to trigger the terminal to establish the session.

It may be understood that there may be a session connection between the terminal and a network before step 701. For example, the session connection before the terminal performs step 701 may be a session connection of a second session, where the second session may be for the terminal to access a central network. It should be noted that, in this application, it is assumed that a session attribute of the second session for accessing the central network is the same as that of a first session for accessing a local network. The session attribute may be an SSC mode, a DNN, S-NSSAI, or the like.

It may be further understood that the session management function network element in this embodiment of this application may be an SMF, but is not limited thereto. For ease of description, the SMF is used as an example for description in the following embodiment.

It may be further understood that the SMF in the embodiment shown in FIG. 7 may manage all UPFs. That is, a service area (SA) of the SMF is an entire PLMN.

Optionally, the terminal may establish the session connection of the second session before step 701.

The terminal starts a first service, and sends a DNS query message to a RAN to obtain an IP address that is of an EAS and that corresponds to the first service. The DNS query message includes a domain name (for example, an FQDN 2) of the first service. The RAN sends the DNS query message to a PSA. The PSA detects the DNS query message, and sends the DNS query message to the SMF. That the PSA detects the DNS query message may be identifying a service type based on the domain name in the DNS query message. For example, the PSA processes only some domain names that belong to a preset domain name list or some service types that belong to a preset service type list. If the domain name in the DNS query message does not belong to the preset domain name list, the domain name in the DNS query message is not sent to the SMF. The SMF may obtain, based on a stored mapping relationship between a domain name and a DNAI, a target DNAI (target DNAI) corresponding to the domain name in the query message.

It may be understood that the mapping relationship that is stored by the SMF and that is between the domain name and the DNAI includes a correspondence between an identifier of the first service and the target DNAI. The correspondence may be considered as a list or a table. This is not limited in this application. The identifier of the first service may be represented by the domain name of the first service.

It may be further understood that the DNS query message mentioned in this application may alternatively be a first uplink packet of the service. For example, that the PSA detects the DNS query message may be that the PSA detects the first uplink packet of the service.

Optionally, the trigger message further includes indication information, and the indication information indicates that a current session connection of the terminal is the session connection of the second session.

The indication information may indicate a cause value. After receiving the trigger message, the terminal may learn that the current session connection of the terminal is for accessing the central network. This can help select a session for subsequently sending a new service.

Optionally, the trigger message further includes indication information. The indication information indicates the terminal to carry an identifier of a current session, namely, an identifier of the second session, when the terminal establishes the first session. In other words, the indication information indicates the terminal to carry a session identifier of an existing session when the terminal creates the session.

702: The terminal sends a first message to the SMF based on the trigger message, where the first message requests to establish the first session, and the first session is for the terminal to access a first local network.

It may be understood that the terminal sends a NAS message to an AMF, where the NAS message includes the session identifier of the second session and a first session establishment request. The AMF sends the first message to the SMF, where the first message includes the first session establishment request, and the first session establishment request may include the session identifier of the second session. That the first session establishment request includes the session identifier of the second session may alternatively be understood as that the first message includes the session identifier of the second session.

703: The SMF determines a target network access identifier based on the first message.

Optionally, if there is a second session between the terminal and the network before step 701, the first message may include the session identifier of the second session and a session identifier of the first session. In this way, the SMF determines, based on the session identifier of the second session and a mapping relationship, the target network access identifier corresponding to the session identifier of the second session. In addition, the SMF may use the target network access identifier corresponding to the session identifier that is of the second session and that is in the first message as a network access identifier corresponding to the session identifier of the first session. The mapping relationship is a mapping relationship between at least one session identifier and at least one network access identifier. In addition, the mapping relationship includes a correspondence between the identifier of the second session and the target network access identifier.

It may be understood that the SMF may prestore a correspondence between the at least one session identifier and the at least one network access identifier, where the at least one session identifier includes the identifier of the second session. Alternatively, in a process of establishing the second session, the SMF stores the correspondence between the session identifier of the second session and the target network access identifier. In this way, the SMF may determine the corresponding target network access identifier based on the identifier that is of the second session and that is included in the first session establishment request.

It may be further understood that, after receiving the first message, the SMF may store a correspondence between the session identifier of the first session and the target network access identifier. In other words, the SMF may store a correspondence among the session identifier of the first session, the session identifier of the second session, and the target network access identifier. The SMF may further store a correspondence between another session and a network access identifier. This is not limited in this application.

It should be noted that the foregoing descriptions are provided by using an example in which the SMF stores a correspondence between a session identifier and the target network access identifier. Optionally, the SMF may alternatively store the target network access identifier. After receiving the first message, the SMF determines a target UPF for the first session based on the stored target network access identifier. Optionally, for a session whose SSC mode is an SSC mode 3, the SMF determines the target UPF for the first session based on the stored target network access identifier. After receiving the first message, the SMF determines whether the first session is in SSC mode 3. If the first session is in SSC mode 3, the SMF determines the target UPF for the first session based on the stored target network access identifier. If the first session is not in SSC mode 3, the SMF does not consider the stored target network access identifier when selecting the target UPF. Similarly, the foregoing logic is also applicable to the case in which the SMF stores the correspondence between the session identifier and the target network access identifier.

It should be further noted that, optionally, a manner in which the SMF deletes the target network access identifier or the correspondence between the session identifier and the target network access identifier includes: The SMF deletes the target network access identifier or the correspondence after the SMF determines the target UPF for the first session; the SMF deletes the target network access identifier or the correspondence after a period of time; and/or the SMF deletes the target network access identifier or the correspondence when the second session is released.

It should be further noted that, optionally, in a process in which UE creates a session 1, the UE may send a UE capability to the SMF, to indicate that the UE supports carrying of an old session identifier. It may be understood that, the UE capability may alternatively be described as that the UE supports carrying of multiple session identifiers, or may be described as that the UE is R17 UE. Optionally, the SMF determines, based on the UE capability, a manner of processing the target network access identifier: (1) When the UE supports carrying of the old session identifier, the SMF stores the correspondence between the target network access identifier and the session identifier. In a new session establishment process initiated by the UE, the SMF determines the target network access identifier based on the old session identifier carried by the UE and the correspondence, and selects the target UPF based on the target network access identifier. (2) When the UE does not support carrying of the old session identifier, the SMF stores the target network access identifier and starts a timer. When the timer expires, the SMF deletes the target network access identifier. In a new session establishment process initiated by the UE, the SMF selects the target UPF based on the stored target network access identifier.

704: The SMF determines the target UPF based on the target network access identifier.

After the SMF selects the target UPF, the terminal may be connected to a target local network via an access network device and the target UPF. That is, establishment of a connection of the first session is completed. In this way, the terminal may transmit and process a service by using the first session.

The target local network is a local network in which the first service in step 701 is located, and the target UPF is a user plane function network element through which the terminal accesses the target local network.

Optionally, that the terminal sends the first service to the local network may be: first receiving an IP address of an EAS in the first local network, and sending the service to the EAS in the first local network based on the IP address of the EAS.

That the terminal obtains the IP address that is of the EAS and that is for transmitting the first service may be as follows: The terminal sends a DNS query request message to a DNS server, where the DNS query request message includes a domain name (for example, an FQDN 1) of the first service; and the DNS server determines the corresponding IP address of the EAS based on the domain name of the first service, and sends a DNS response message to the terminal, where the DNS response message includes the IP address of the EAS.

In an implementation, the terminal may initiate a DNS query for the first service on a user plane connection of the first session.

In another implementation, the terminal may initiate a DNS query for the first service on a user plane connection of the second session, where the user plane connection of the second session includes the target UPF.

In still another implementation, the terminal may not re-initiate a DNS query; and when receiving the DNS query request message corresponding to the first service, the SMF stores the DNS query request message corresponding to the first service. When determining that the establishment of the first session is completed, the SMF forwards the stored DNS query request message to the DNS server via the target UPF corresponding to the first session, and obtains, from the DNS server, the EAS IP corresponding to the first service, and then the target UPF sends the EAS IP to the terminal, to complete the DNS query for the first service.

In still another implementation, the terminal does not re-initiate a DNS query; and when receiving the DNS query request message corresponding to the first service, the SMF stores the DNS query request message corresponding to the first service. In addition, the SMF forwards the DNS query request message to the DNS server, and obtains, from the DNS server, the EAS IP corresponding to the first service, and then the SMF sends the EAS IP to the UE. It may be understood that the SMF may carry a current location of the terminal when forwarding the DNS query message.

It may be understood that, in this embodiment of this application, the DNS server may be a centralized DNS server, or may be a local DNS server. Relatively, the centralized DNS server is deployed at a higher location, and the local DNS server is deployed at a lower location. For example, the local DNS server is close to the terminal or a UPF.

Optionally, after step 704, when starting a new APP (which is referred to as a "target service" below), the terminal may further select a session from the first session and the second session as the target session based on a first routing condition and a second routing condition, to transmit and process a service by using the target session. The first routing condition is sent by the SMF to the terminal in a process of establishing the first session, and the second routing condition is sent by the SMF to the terminal in a process of establishing the second session.

The first routing condition is a condition for the terminal to select the first session, and the second routing condition is a condition for the terminal to select the second session. In this way, when starting the target service, the terminal can determine, based on the first routing condition and the second routing condition, whether to select a first route or a second route. Then, the terminal sends the target service through the selected route.

It may be understood that the routing condition may also be referred to as a "forwarding rule".

It may be further understood that when starting the new APP (which is referred to as the "target service" below), the terminal may directly obtain a domain name corresponding to the target service. When the first routing condition and the second routing condition each are represented by a domain name of a service, the terminal may directly select a session based on the domain name corresponding to the target service. However, when the first routing condition and the second routing condition each are not represented by a domain name of a service (for example, represented by a target IP address segment), the terminal cannot obtain, when starting the target service, an IP corresponding to the target service, and cannot select a session based on the first routing condition and the second routing condition.

Optionally, after step 704, when the terminal starts a new APP (which is referred to as a "target service" below), if the terminal does not obtain a first routing condition and a second routing condition, or the terminal cannot select a session from the first session and the second session by providing an obtained first routing condition and second routing condition, the terminal may select the session in the following manner.

It should be noted that the terminal has established the first session and the second session after step 704. The first session is for accessing the local network, and the first session is served by a PSA 1. The second session is for accessing a central network, and the second session is served by a PSA 2. The PSA 1 and the PSA 2 are managed by the SMF. In other words, the SMF may manage all the UPFs. That is, the service area (SA) of the SMF is the entire PLMN. It should be understood that the PSA is a type of a UPF.

It should be further noted that, in a process of establishing the first session and the second session, the AMF stores a correspondence between a session identifier and a network access identifier. For example, the correspondence between the network access identifier and the session identifier may be sent by the SMF to the AMF in the session establishment process. Table 4 shows a correspondence.

TABLE 4

| Session identifier | Network access identifier |
| --- | --- |
| Session 1 | DNAI-a |
| Session 2 | \ |

In an implementation, a process in which the AMF stores the session identifier and the network access identifier may be as follows: The terminal selects any session (for example, the session 2) from existing sessions to initiate a DNS query of the target service. The SMF determines, based on a service identifier (for example, a service domain name of the target service) that is of the target service and that is carried in the received DNS query and a stored correspondence between a service identifier and a network access identifier, a target network access identifier (denoted as DNAI-a herein) corresponding to the service identifier of the target service. The SMF sends the target network access identifier to the AMF. If the AMF does not find a session identifier of the target session corresponding to the target network access identifier, the AMF temporarily stores a correspondence between the target network access identifier and the session identifier of the current session of the terminal (namely, a correspondence between the session 2 and DNAI-a). Then, the terminal establishes a session (denoted as the session 1 herein) corresponding to the target service. In a process of creating the session, the AMF updates the originally stored correspondence between the target network access identifier and the session identifier (namely, the correspondence between the session 2 and DNAI-a) to a correspondence between the target network access identifier and a session identifier of the created session (namely, a correspondence between the session 1 and DNAI-a).

It may be understood that the AMF may further store a session identifier of another session and a corresponding DNAI, or may further store other DNAIs corresponding to the session 1 and the session 2.

It should be noted that the foregoing descriptions are provided by using an example in which the AMF updates the correspondence between the target network access identifier and the session identifier. Optionally, the AMF may alternatively delete the correspondence between the target network access identifier and the session identifier. In a process of creating the session (namely, the session 1), the AMF selects a target SMF based on a DNAI in the stored correspondence between the target network access identifier and the session identifier (namely, the correspondence between the session 2 and DNAI-a), and deletes the stored correspondence. It may be understood that a method for deleting the correspondence between the target network access identifier and the session identifier by the AMF may alternatively be as follows: The AMF deletes a stored correspondence between a network access identifier and a session attribute after a period of time; and/or the AMF deletes a stored correspondence between a network access identifier and a session attribute when the session 2 is released.

It should be noted that the foregoing descriptions are provided by using an example in which the AMF stores the correspondence between the target network access identifier and the session identifier. Optionally, the AMF may alternatively store the target network access identifier. In this case, in a process in which the UE creates the session 1, the AMF selects a target SMF based on the stored target network access identifier. It may be understood that a method for deleting the stored target network access identifier by the AMF includes: The AMF deletes the target network access identifier after the AMF determines the target SMF for the session 1, that is, after the AMF determines the target SMF based on the stored target network access identifier; the AMF deletes the target network access identifier after a period of time; and/or the AMF deletes the target network access identifier when the session 2 or the session 1 is released.

Optionally, for the session whose SSC mode is the SSC mode 3, the SMF sends the target network access identifier or the correspondence between the target network access identifier and the session identifier to the AMF. As described in step 701, when the SMF determines the target network access identifier, the SMF determines whether the session is in the SSC mode 3. If the session is in the SSC mode 3, the SMF sends the target network access identifier or the correspondence between the target network access identifier and the session identifier to the AMF. If the session is not in the SSC mode 3, the SMF does not send the target network access identifier to the AMF. In other words, determining the target SMF or the target UPF based on a target access network, e.g., based on the target network access identifier, is applicable only to the session in the SSC mode 3.

It should be noted that, optionally, in the process in which the UE creates the session 1, the UE may send the UE capability to the AMF, to indicate that the UE supports carrying of the old session identifier. It may be understood that, the UE capability may alternatively be described as that the UE supports carrying of the multiple session identifiers, or may be described as that the UE is the R17 UE. Optionally, the AMF determines, based on the UE capability, a manner of processing the target network access identifier: (1) When the UE supports carrying of the old session identifier, the AMF stores the correspondence between the target network access identifier and the session identifier. In the new session establishment process initiated by the UE, the AMF determines the target network access identifier based on the old session identifier carried by the UE and the correspondence, and selects the target SMF based on the target network access identifier. (2) When the UE does not support carrying of the old session identifier, the AMF stores the target network access identifier and starts the timer. When the timer expires, the AMF deletes the target network access identifier. In the new session establishment process initiated by the UE, the AMF selects the target SMF based on the stored target network access identifier.

Table 4 shows that the AMF stores the correspondence between the session identifier and the network access identifier in the process of establishing the first session and the second session. It should be noted that, in another implementation, the AMF stores the correspondence between the session attribute and the network access identifier in the process of establishing the first session and the second session. For example, the correspondence between the network access identifier and the session attribute may be sent by the SMF to the AMF in the session establishment process. For another example, a correspondence between the network access identifier and some session attributes may be sent by the SMF to the AMF in the session establishment process, and the other session attributes may be sent by the UE to the AMF in the session establishment process. The session attribute refers to the DNN, the S-NSSAI, a PDU session type, the SSC mode, or the like corresponding to the session. Table 5 shows a correspondence.

TABLE 5

| Session identifier | Network access identifier |
|---|---|
| Some or all session attributes of a session 1 | DNAI-a |
| Some or all session attributes of a session 2 | \ |

In an implementation, a process in which the AMF stores the session attribute of the session and the network access identifier may be as follows: The terminal initiates a session establishment process (where the session 2 is used as an example herein), including: The UE sends a NAS message to the AMF, where the NAS message carries a session establishment request, a DNN, S-NSSAI, and a session identifier. The AMF stores the session identifier, the DNN, and the S-NSSAI, where the DNN, the S-NSSAI, and the session identifier are stored on the AMF as some session attributes. The terminal initiates the DNS query of the target service on the session 2. The SMF determines, based on the service identifier (for example, the service domain name of the target service) that is of the target service and that is carried in the received DNS query and the stored correspondence between the service identifier and the network access identifier, the target network access identifier (denoted as DNAI-a herein) corresponding to the service identifier of the target service. The SMF sends the target network access identifier and some session attributes/all session attributes to the AMF, where the some session attributes/all the session attributes include: the DNN, the S-NSSAI, an SSC mode, the session identifier, and the like. The AMF stores a correspondence between the target network access identifier and the some session attributes/all the session attributes. In this case, the AMF may store a correspondence between the target network access identifier and the session attribute based on the some session attributes received from the UE and the some/all session attributes received from the SMF.

It may be understood that, in this case, the indication information included in the trigger message in step 701 indicates the terminal to carry a session attribute when the terminal establishes the first session, and the session attribute is sent by the UE to the AMF.

Further, when the AMF receives the first message sent by the terminal in step 702, the first message carries the session attribute. The AMF determines, based on the session attribute in the first message and the stored correspondence between the network access identifier and the session attribute, a network access identifier corresponding to the session attribute in the first message, and selects a new SMF based on the network access identifier.

Optionally, after the AMF selects the new SMF, the AMF deletes the stored correspondence between the network access identifier and the session attribute. Optionally, the AMF may delete the stored correspondence between the network access identifier and the session attribute after the period of time. Optionally, the AMF may delete the stored correspondence between the network access identifier and the session attribute when the session 2 is released.

Manner A

In this manner, in a process in which a terminal queries for an IP address corresponding to a target service, an SMF determines whether a session needs to be created. If no session needs to be created, a reused session needs to be further determined, and a corresponding session identifier is sent to the terminal. If the session needs to be created, the SMF may trigger the terminal to create the session. It should be noted that the descriptions may be alternatively replaced with that the SMF determines whether an existing session can be reused; and if the existing session can be reused, the SMF sends an identifier corresponding to the reused session to the terminal; or if the existing session cannot be reused, the SMF triggers the terminal to create the session.

It should be noted that, if the terminal determines, according to a policy, that multiple sessions satisfy a requirement of the target service, the terminal may select any one of the multiple sessions to transmit a domain name query request corresponding to the target service.

Manner A is described in detail below with reference to FIG. 8 by using an example in which a terminal selects a first session to transmit a domain name query request corresponding to a target service. A PSA corresponding to the first session is denoted as a PSA 1.

S801: The terminal sends information #a1 (namely, first information) to an SMF, where the information #a1 is for determining a session for sending the domain name query request corresponding to the target service, and the information #a1 includes a domain name of the target service.

It should be noted that the information #a1 may alternatively be described as being for determining an IP address corresponding to the domain name of the target service. In other words, the information #a1 may be a DNS query.

In an implementation, the terminal sends the information #a1 to the SMF via a RAN and the PSA 1, where the information #a1 is for determining the session for sending the domain name query request corresponding to the target service, and the information #a1 includes the domain name of the target service. For example, the domain name of the target service is an FQDN 3.

It should be noted that, that the PSA 1 sends the information #a1 to the SMF may alternatively be described as that the PSA 1 sends the domain name included in the information #a1 to the SMF.

For example, a process in which the terminal sends the information #a1 to the SMF via the RAN and the PSA 1 may be as follows: The terminal sends the information #a1 to the RAN, where the information #a1 includes the domain name of the target service. The RAN sends the information #a1 to the PSA 1. When detecting the information #a1, the PSA 1 reports the information #a1 to the SMF. A process in which the PSA 1 detects the information #a1 may be identifying a service type based on the domain name that is of the target service and that is in the information #a1. For example, the PSA 1 processes only some domain names that belong to a preset domain name list or some service types that belong to a preset service type list. If the domain name in the information #a1 does not belong to the preset domain name list, the domain name in the information #a1 is not sent to the SMF. The SMF may obtain, based on a stored mapping relationship between a domain name and a DNAI, a target DNAI) corresponding to the domain name in request information.

It should be noted that the information #a1 may be a domain name query request (a DNS query). The detecting the information #a1 and the reporting the information #a1 may alternatively be implemented by a network element other than the PSA 1, for example, an edge application server discovery function (EASDF) network element. The EASDF is configured to process a message, for example, a DNS query and a DNS response, related to the domain name, may be deployed after the PSA 1.

It should be noted that a manner in which UE sends the information #a1 to the SMF may be that the UE sends the information #a1 to the SMF via an AMF. For a sending manner herein, refer to a conventional technology. Details are not described herein in this application.

S802: The SMF determines whether there is a session identifier corresponding to the target service.

In an implementation, if the domain name that is of a service and that is stored by the SMF includes the domain name that is of the target service and that is in the information #a1, the SMF determines that there is a session identifier corresponding to the domain name of the target service. Further, the SMF determines the session identifier corresponding to the domain name of the target service.

In an implementation, the SMF may determine, based on a correspondence between a domain name of a service and a network access identifier and a correspondence between the network access identifier and a session identifier, the session identifier corresponding to the domain name of the target service. For example, the SMF first determines, based on a stored correspondence between the domain name of the service and the network access identifier, a data network access identifier DNAI corresponding to the target service, where the DNAI may be denoted as DNAI-b. Then, the SMF determines, based on the stored correspondence between the network access identifier and the session identifier, a session identifier corresponding to the DNAI-b, where the session identifier corresponding to the reused session may be denoted as a session x.

In an implementation, the SMF may determine, based on a correspondence between a domain name of a service and a session identifier, the session identifier corresponding to the domain name of the target service. For example, the SMF determines the correspondence between the domain name of the service and the session identifier based on a stored correspondence between the domain name of the service and a network access identifier and a stored correspondence between the network access identifier and the session identifier, and then determines, based on the correspondence between the domain name of the service and the session identifier, the session identifier corresponding to the domain name of the target service, where the session identifier corresponding to the reused session may be denoted as a session x.

It may be understood that, in the foregoing implementations, the correspondence (which is also referred to as the mapping relationship) that is stored by the SMF and that is between the domain name of the service and the DNAI includes a correspondence between the identifier of the target service and the target DNAI, and the correspondence that is stored by the SMF and that is between the network access identifier and the session identifier includes a correspondence between a target network access identifier and a target session identifier. The correspondence may be considered as a list or a table. This is not limited in this application. The identifier of the target service may be represented by the domain name of the target service.

In an implementation, if the domain name that is of a service and that is stored by the SMF does not include the domain name that is of the target service and that is in the information #a1, the SMF determines that there is no session identifier corresponding to the domain name of the target service.

S803: The SMF sends information #a2 to the UE, where the information #a2 is for determining a session for transmitting the target service.

It should be noted that the determined session for transmitting the target service may be a session (namely, the reused session) in existing sessions, or may be a created session.

In an implementation, if the SMF determines that there is a session identifier corresponding to the domain name of the target service, the SMF sends the information #a2 to the UE. The information #a2 includes the session identifier, namely, the session x, corresponding to the domain name of the target service, and indicates the terminal to transmit a service by using the session X.

In an implementation, if the SMF determines that there is no session corresponding to the domain name of the target service, the SMF sends the information #a2 to the UE, to indicate the terminal to initiate the new session. Optionally, the information #a2 is empty, and does not include the identifier of the reused session, or the identifier of the reused session is empty.

Optionally, the information #a2 may further include indication information. The indication information indicates the terminal to transmit the target service by using the session x, or indicates that there is no session identifier corresponding to the domain name of the target service in the existing sessions.

It should be noted that a manner in which the SMF sends the information #a2 to the terminal may be that the SMF sends the information #a2 to the terminal via the AMF. For a sending manner herein, refer to the conventional technology. Details are not described herein in this application.

S804: The terminal determines the session for transmitting the target service.

In an implementation, the terminal receives the information #a2. If the information #a2 includes the session identifier—the session x corresponding to the target service, the terminal determines to transmit the target service by using the session x.

Optionally, the terminal may initiate a domain name query request (namely, a DNS query) on the session x, to obtain the IP address corresponding to the target service.

In an implementation, the terminal receives the information #a2. If the information #a2 is empty, or the indication information in the information #a2 indicates that there is no session identifier corresponding to the domain name of the target service in the existing sessions, the terminal may establish a new session, so that the terminal can transmit a service on the created session. Optionally, the terminal initiates a domain name query request (namely, a DNS query) on the created session, to obtain the IP address corresponding to the target service. For a manner of creating the session herein, refer to the manner of establishing the first session in this application. Details are not described herein again.

It should be noted that, the session identifier represented by the session 1, the session 2, or the session x is merely an example. It should be understood that the session identifier may be alternatively represented in another form. This is not limited herein in this application.

It should be further noted that the method described in this embodiment is not only applicable to a case in which the terminal has established the second session for accessing the central network and the first session for accessing the local network, but also applicable to a case in which the terminal has established only the second session for accessing the central network. In this case, the method described in this embodiment may be further for triggering a process of establishing the second session. Similarly, the method described in this embodiment may be further applicable to a case in which the terminal has established the second session for accessing the central network and another session (for example, a third session) for accessing another local network. A quantity of sessions that have been established by the terminal and that are for accessing local networks is not limited herein.

In the foregoing embodiment, the terminal actively initiates the procedure of creating the session or the SMF triggers the terminal to create the session. In another implementation, an AMF may alternatively trigger a terminal to create a session. The following describes this implementation with reference to FIG. 9.

Figure 9:
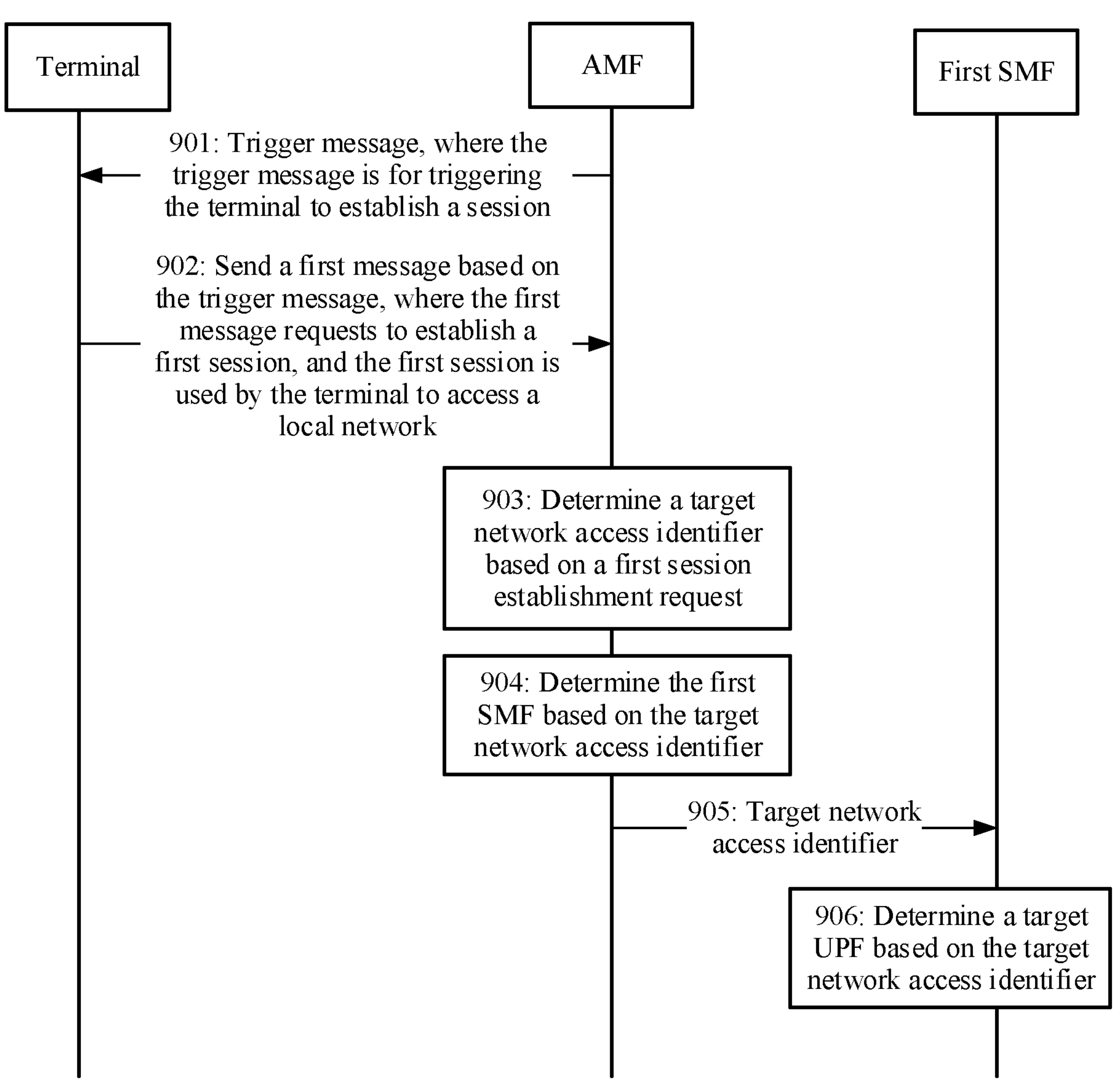
FIG. 9 is a schematic flowchart of a local network accessing method according to yet another embodiment of this application.

FIG. 9 is a schematic flowchart of a local network accessing method according to an embodiment of this application.

It should be noted that, unless otherwise specified, same terms in the embodiment shown in FIG. 9 and the embodiment shown in FIG. 7 have a same meaning.

It should be further noted that, when there is no logical contradiction, the embodiment shown in FIG. 9 may be randomly combined with the foregoing embodiments.

901: An AMF sends a trigger message to a terminal, where the trigger message is for triggering the terminal to establish a session.

Optionally, the terminal may establish a session connection of a second session before step 901.

The terminal starts a first service, and sends a DNS query message to a RAN to obtain an IP address that is of an EAS and that corresponds to the first service. The DNS query message includes a domain name (for example, an FQDN 2) of the first service. The RAN sends the DNS query message to a PSA. The PSA detects the DNS query message, and sends the DNS query message to an SMF 2. That the PSA detects the query message may be identifying a service type based on the domain name in the DNS query message. For example, the PSA processes only some domain names that belong to a preset domain name list or some service types that belong to a preset service type list. If the domain name in the DNS query message does not belong to the preset domain name list, the domain name in the DNS query message is not sent to the SMF 2. The SMF 2 may obtain, based on a stored mapping relationship between a domain name and a DNAI, a target DNAI (target DNAI) corresponding to the domain name in the query message.

It may be understood that the mapping relationship that is stored by the SMF 2 and that is between the domain name and the DNAI includes a correspondence between an identifier of the first service and the target DNAI. The correspondence may be considered as a list or a table. This is not limited in this application.

It may be understood that the AMF sends the trigger message to the terminal means that the AMF receives the trigger message sent by the SMF 2, and sends the trigger message to the terminal. Optionally, the SMF 2 further sends a session identifier of the second session and the target DNAI to the AMF. Accordingly, the AMF stores the session identifier of the second session and the target DNAI.

It may be understood that, the AMF may further store a session identifier of another session and a corresponding DNAI.

It may be further understood that the DNS query message mentioned in this application may alternatively be a first uplink packet of the service. For example, that the PSA detects the DNS query message may be that the PSA detects the first uplink packet of the service.

Optionally, the trigger message further includes indication information, and the indication information indicates that a current session connection of the terminal is the session connection of the second session.

The indication information may indicate a cause value. After receiving the trigger message, the terminal may learn that the current session connection of the terminal is for accessing a central network. This can help select a session for subsequently sending a new service.

Optionally, the trigger message further includes indication information. The indication information indicates the terminal to carry an identifier of a current session, namely, the identifier of the second session, when the terminal establishes the first session. In other words, the indication information indicates the terminal to carry a session identifier of an existing session when the terminal creates a session.

902: The terminal sends a first message based on the trigger message, where the first message requests to establish the first session, and the first session is for the terminal to access a local network.

It may be understood that the terminal sends a NAS message to the AMF, where the NAS message includes the session identifier of the second session and a first session establishment request.

903: The AMF determines a target network access identifier based on the first session establishment request.

Optionally, if there is a second session between the terminal and a network before step 901, the NAS message may include the session identifier of the second session. In this way, the AMF may determine, based on the session identifier of the second session and a mapping relationship, the target network access identifier corresponding to the session identifier of the second session. The mapping relationship is a mapping relationship between at least one session identifier and at least one network access identifier.

It may be understood that, the AMF may prestore a correspondence between the at least one session identifier and the at least one network access identifier. That is, as mentioned in step 901, the AMF stores a session identifier and a corresponding DNAI. The at least one session identifier includes the identifier of the second session. In this way, the AMF may determine the corresponding target network access identifier based on the identifier that is of the second session and that is included in the first session establishment request.

Optionally, a mapping relationship between the identifier of the second session and the corresponding network access identifier is used as an example. The mapping relationship may be sent by a second SMF (namely, the SMF 2) to the AMF in a process of establishing the second session.

The second SMF provides a session management service for the second session.

The second SMF (which may be referred to as the "SMF 2" below) may be configured to establish the second session for the terminal. The second SMF generates the mapping relationship between the at least one session identifier and the at least one network access identifier, and sends the mapping relationship to the AMF. In this way, the AMF may determine, based on the mapping relationship, the target network access identifier corresponding to the session identifier of the second session.

904: The AMF determines a first SMF based on the target network access identifier.

The SMF in this embodiment of this application has a limited service area. Therefore, the AMF may select, based on the target network access identifier, the first SMF (which may be referred to as an "SMF 1" below) that can provide a service.

905: The AMF sends the target network access identifier to the first SMF.

906: The first SMF determines a target UPF based on the target network access identifier.

After the SMF 1 selects the target UPF, the terminal may be connected to a target local network via an access network device and the target UPF. That is, establishment of a connection of the first session is completed. In this way, the terminal may transmit and process a service by using the first session.

Optionally, that the terminal sends the first service to the local network may be: first receiving an IP address of an EAS in a first local network, and sending the service to the EAS in the first local network based on the IP address of the EAS.

In an implementation, the terminal may initiate a DNS query for the first service on a user plane connection of the first session.

In another implementation, the terminal may initiate a DNS query for the first service on a user plane connection of the second session, where the user plane connection of the second session includes the target UPF.

When the terminal performs the DNS query on the user plane connection of the previous second session, a PSA 1 sends the DNS query message to the SMF 2, the SMF 2 sends the DNS query to the SMF 1 via the AMF, and the SMF 1 adds a current location of UE to the DNS query, and sends a DNS query to a DNS server.

In still another implementation, the terminal may not re-initiate a DNS query; and when receiving the DNS query message corresponding to the first service, the SMF 2 stores the DNS query request corresponding to the first service. The SMF 2 forwards the stored DNS query to a DNS server via the AMF and the SMF 1, and obtains the EAS IP corresponding to the first service from the DNS server. Then, the SMF 2 or the SMF 1 sends the EAS IP to the UE, to complete the DNS query for the first service.

The SMF 2 caches the DNS query of the second session till establishment of the first session is completed. The SMF 2 sends the cached DNS query to the SMF 1 via the AMF. The SMF 1 sends the DNS query to the DNS server.

It may be understood that the SMF 2 caches the DNS query request may alternatively be replaced with that the AMF caches the DNS query request.

It may be understood that the SMF may carry the current location of the terminal when forwarding the DNS query message.

In still another implementation, the terminal does not re-initiate a DNS query; and when receiving the DNS query message corresponding to the first service, the SMF 2 stores the DNS query message corresponding to the first service. In addition, when determining that establishment of the first session is completed, the SMF 2 forwards the stored DNS query to a DNS server via the AMF, the SMF 1, and the target UPF in step 706, and obtains, from the DNS server, the EAS IP corresponding to the first service. The target UPF sends the EAS IP to the terminal.

It may be understood that, in this embodiment of this application, the DNS server may be a centralized DNS server, or may be a local DNS server. Relatively, the centralized DNS server is deployed at a higher location, and the local DNS server is deployed at a lower location. For example, the local DNS server is close to the terminal or a UPF.

It may be further understood that when starting the new APP (which is referred to as the "target service" below), the terminal may directly obtain a domain name corresponding to the target service. When a first routing condition and a second routing condition each are represented by a domain name of a service, the terminal may directly select a session based on the domain name corresponding to the target service. However, when a first routing condition and a second routing condition each are not represented by a domain name of a service (for example, represented by a target IP address segment), the terminal cannot obtain, when starting the target service, an IP corresponding to the target service, and cannot select a session based on the first routing condition and the second routing condition.

Optionally, after step 906, when the terminal starts a new APP (which is referred to as a "target service" below), if the terminal does not obtain a first routing condition and a second routing condition, or the terminal cannot select a session from the first session and the second session by providing an obtained first routing condition and second routing condition, the terminal may select the session in the following manner.

It should be noted that the terminal has established the first session and the second session after step 906. The first session is for accessing the local network, the first session is served by the PSA 1 and the SMF 1 (namely, the first SMF). The second session is for accessing the central network, and the second session is served by a PSA 2 and the SMF 2 (namely, the second SMF). It should be understood that, in this embodiment, each UPF is managed by an SMF corresponding to the UPF. For example, the PSA 1 is managed by the SMF 1. It should be understood that a PSA is a type of a UPF.

It should be further noted that, in a process of establishing the first session and the second session, the AMF stores a correspondence among a session identifier, a network access identifier, and an SMF identifier. The correspondence between the network access identifier and the session identifier may be sent by the corresponding SMF to the AMF in the session establishment process. In an example, Table 6 shows a correspondence.

TABLE 6

| Session identifier | Network access identifier | SMF identifier |
| --- | --- | --- |
| Session 1 | DNAI-a | SMF 1 |
| Session 2 | \ | SMF 2 |

In an implementation, a process in which the AMF stores the session identifier and the network access identifier may be as follows: The terminal selects any session (for example, the session 2) from existing sessions to initiate a DNS query of the target service. After receiving the DNS query, the SMF determines, based on a service identifier (for example, a service domain name of the target service) that is of the target service and that is carried in the DNS query and a stored correspondence between a service identifier and a network access identifier, the target network access identifier (denoted as DNAI-a herein) corresponding to the service identifier of the target service. The SMF sends the target network access identifier to the AMF. If the AMF does not find a session identifier of the target session corresponding to the target network access identifier, the AMF temporarily stores a correspondence between the target network access identifier and the session identifier of the current session of the terminal (namely, a correspondence between the session 2 and DNAI-a). Then, the terminal establishes a session (denoted as the session 1 herein) corresponding to the target service. In a process of creating the session, the AMF updates the originally stored correspondence between the target network access identifier and the session identifier (namely, the correspondence between the session 2 and DNAI-a) to a correspondence between the target network access identifier and a session identifier of the created session (namely, a correspondence between the session 1 and DNAI-a).

It may be understood that the AMF may further store a session identifier of another session, a corresponding DNAI, and a corresponding SMF identifier, or may further store other DNAIs corresponding to the session 1 and the session 2.

It should be noted that the foregoing descriptions are provided by using an example in which the AMF updates the correspondence between the target network access identifier and the session identifier. Optionally, the AMF may alternatively delete the correspondence between the target network access identifier and the session identifier. In a process of creating the session (namely, the session 1), the AMF selects a target SMF based on a DNAI in the stored correspondence between the target network access identifier and the session identifier (namely, the correspondence between the session 2 and DNAI-a), and deletes the stored correspondence. It may be understood that a method for deleting the correspondence between the target network access identifier and the session identifier by the AMF may alternatively be as follows: The AMF deletes a stored correspondence between a network access identifier and a session attribute after a period of time; and/or the AMF deletes a stored correspondence between a network access identifier and a session attribute when the session 2 is released.

It should be noted that, optionally, the foregoing descriptions are provided by using an example in which the AMF stores the correspondence between the target network access identifier and the session identifier. Optionally, the AMF may alternatively store the target network access identifier. In this case, in a process in which the UE creates the session 1, the AMF selects a target SMF based on the stored target network access identifier. It may be understood that a method for deleting the stored target network access identifier by the AMF includes: The AMF deletes the target network access identifier after the AMF determines the target SMF for the session 1, that is, after the AMF determines the target SMF based on the stored target network access identifier; the AMF deletes the target network access identifier after a period of time; and/or the AMF deletes the target network access identifier when the session 2 or the session 1 is released.

Optionally, for a session whose SSC mode is an SSC mode 3, the SMF sends the target network access identifier or the correspondence between the target network access identifier and the session identifier to the AMF. As described in step 701, when the SMF determines the target network access identifier, the SMF determines whether the session is in the SSC mode 3. If the session is in the SSC mode 3, the SMF sends the target network access identifier or the correspondence between the target network access identifier and the session identifier to the AMF. If the session is not in the SSC mode 3, the SMF does not send the target network access identifier to the AMF. In other words, determining the target SMF or the target UPF based on a target access network, e.g., based on the target network access identifier, is applicable only to the session in the SSC mode 3.

It should be noted that, optionally, in the process in which the UE creates the session 1, the UE may send a UE capability to the AMF, to indicate that the UE supports carrying of an old session identifier. It may be understood that, the UE capability may alternatively be described as that the UE supports carrying of multiple session identifiers, or may be described as that the UE is R17 UE. Optionally, the AMF determines, based on the UE capability, a manner of processing the target network access identifier: (1) When the UE supports carrying of the old session identifier, the AMF stores the correspondence between the target network access identifier and the session identifier. In the new session establishment process initiated by the UE, the AMF determines the target network access identifier based on the old session identifier carried by the UE and the correspondence, and selects the target SMF based on the target network access identifier. (2) When the UE does not support carrying of the old session identifier, the AMF stores the target network access identifier and starts the timer. When the timer expires, the AMF deletes the target network access identifier. In the new session establishment process initiated by the UE, the AMF selects the target SMF based on the stored target network access identifier.

Manner B

In this manner, in a process in which a terminal queries for an IP address corresponding to a target service, an SMF queries an AMF to determine whether a session needs to be created, or an AMF determines whether a session needs to be created. If no session needs to be created, a reused session needs to be further determined, and a corresponding session identifier is sent to the terminal. If the session needs to be created, a network side (for example, the AMF or the SMF) may trigger the terminal to create the session. It should be noted that the descriptions may be replaced with that the SMF or the AMF determines whether an existing session can be reused; and if the existing session can be reused, the SMF or the AMF sends an identifier corresponding to the reused session to the terminal; or if the existing session cannot be reused, the SMF or the AMF triggers the terminal to create the session.

It should be noted that, if multiple sessions satisfy a requirement of the target service, the terminal may select any one of the multiple sessions to transmit a domain name query request corresponding to the target service, and the terminal queries the AMF by using an SMF corresponding to the session, to determine whether the session needs to be created.

Figure 10:
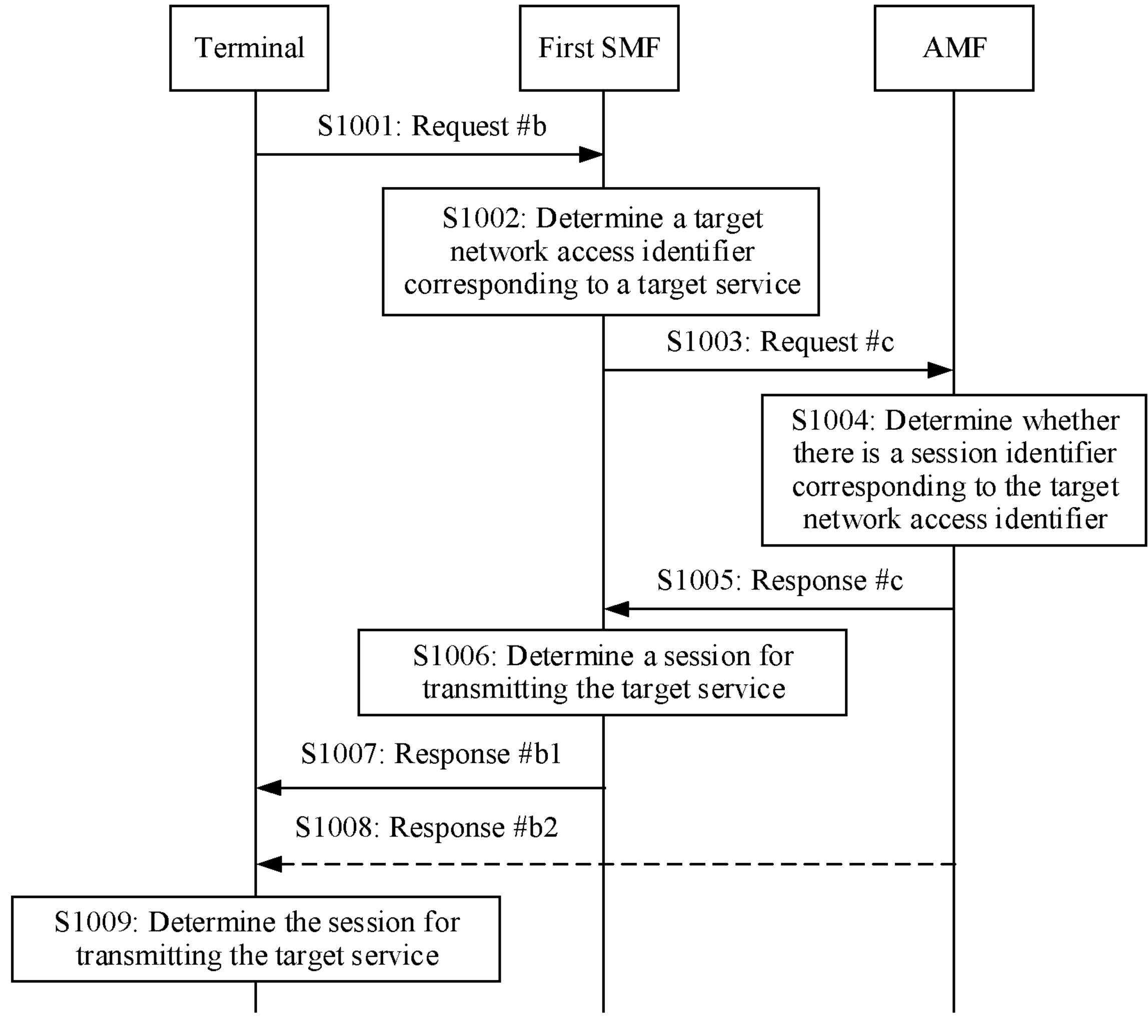
FIG. 10 is a schematic flowchart of a local network accessing method according to yet another embodiment of this application.

Manner B is described in detail below with reference to FIG. 10 by using an example in which a terminal selects a first session to transmit a domain name query request corresponding to a target service. An SMF corresponding to the first session is denoted as an SMF 1, and a PSA corresponding to the first session is denoted as a PSA 1.

S1001: The terminal sends information #b1 to the SMF 1, where the information #b1 is for determining a session for sending the domain name query request corresponding to the target service, and the information #b1 includes a domain name of the target service.

It should be noted that the information #b1 may alternatively be described as being for determining an IP address corresponding to the domain name of the target service. In other words, the information #b1 may be a DNS query.

In an implementation, the terminal sends the information #b1 to the SMF 1 via a RAN and the PSA 1, where the information #b1 is for determining the session for sending the domain name query request corresponding to the target service, and the information #b1 includes the domain name of the target service. For example, the domain name of the target service is an FQDN 3.

It should be noted that, that the PSA 1 sends the information #b1 to the SMF 1 may alternatively be described as that the PSA 1 sends the domain name included in the information #b1 to the SMF 1.

For example, a process in which the terminal sends the information #b1 to the SMF 1 via the RAN and the PSA 1 may be as follows: The terminal sends the information #b1 to the RAN, where the information #b1 includes the domain name of the target service. The RAN sends the information #b1 to the PSA 1. When detecting the information #b1, the PSA 1 reports the information #b1 to the SMF 1. A process in which the PSA 1 detects the information #b1 may be identifying a service type based on the domain name that is of the target service and that is in the information #b1. For example, the PSA 1 processes only some domain names that belong to a preset domain name list or some service types that belong to a preset service type list. If the domain name in the information #b1 does not belong to the preset domain name list, the domain name in the information #b1 is not sent to the SMF 1. The SMF 1 may obtain, based on a stored mapping relationship between a domain name and a DNAI, a target DNAI (target DNAI) corresponding to the domain name in request information.

It should be noted that the information #b1 may be a domain name query request (a DNS query). The detecting the information #b1 and the reporting the information #b1 may alternatively be implemented by a network element other than the PSA 1, for example, an edge application server discovery function (EASDF) network element. The EASDF is configured to process a message, for example, a DNS query and a DNS response, related to the domain name, may be deployed after the PSA 1.

It should be noted that a manner in which UE sends the information #b1 to the SMF 1 may be that the UE sends the information #b1 to the SMF 1 via an AMF. For a sending manner herein, refer to a conventional technology. Details are not described herein in this application.

S1002: The SMF 1 determines a target network access identifier corresponding to the target service, where the target network access identifier may be denoted as DNAI-b.

In an implementation, the SMF 1 determines the target network access identifier corresponding to the domain name that is of the target service and that is in the information #b1, where the target network access identifier may be denoted as DNAI-b.

It should be noted that the SMF 1 stores a correspondence between a domain name of a service and a network access identifier before step S1001. After receiving the information #b1, the SMF 1 may determine, based on the correspondence between the domain name of the service and the network access identifier, that the network access identifier corresponding to the domain name of the target service is DNAI-b.

S1003: The SMF 1 sends a request #c to the AMF, where the request #c includes the target network access identifier, and the request #c requests to query for a session identifier corresponding to the target network access identifier.

Optionally, the request #c may further include an identifier of a current session, namely, an identifier of the first session.

In an implementation, the SMF 1 sends a session query request (namely, the request #c) to the AMF, where the session query request includes the target network access identifier DNAI-b, and the session query request requests to query for the session identifier corresponding to the DNAI-b.

In another implementation, the SMF 1 sends an NIN2 transfer message (Namf_Communication_NIN2Message Transfer) (namely, the request #c) on an Namf interface to the AMF, where Namf_Communication_NIN2Message Transfer includes the target network access identifier DNAI-b, and the NIN2 transfer message on the Namf interface is for querying the session identifier corresponding to DNAI-b.

S1004: The AMF determines whether there is a session identifier corresponding to the target network access identifier.

In an implementation, if a network access identifier stored by the AMF includes DNAI-b in the information #b1, the AMF determines that there is a session identifier corresponding to the target network access identifier. Further, the AMF determines, based on a stored correspondence between a network access identifier and a session identifier, the session identifier corresponding to DNAI-b, and denotes the identifier of the reused session as a session x.

In an implementation, if a network access identifier stored by the AMF does not include DNAI-b in the information #b1, the AMF determines that there is no session identifier corresponding to the target network access identifier.

Optionally, in this case, the AMF may trigger the terminal to create a session corresponding to the target service. For a procedure of creating the session herein, refer to the foregoing embodiments. Details are not described herein again.

It may be understood that the AMF may prestore a correspondence between at least one session identifier and at least one network access identifier, where the at least one network access identifier includes the target network access identifier. In this way, the AMF may determine the corresponding session identifier based on the target network access identifier included in the request #c. It should be understood that the AMF may store the correspondence between the session identifier and the network access identifier in a session establishment process.

In an implementation, if the request #c is a session query request, the following steps S1005 to S1007 may be performed.

S1005: The AMF sends a response #c to the SMF 1, where the response #c corresponds to the request #c.

In an implementation, if the AMF determines that there is a session identifier corresponding to the target network access identifier, the AMF sends a session query response (namely, the response #c) to the SMF 1. The session query response includes the session identifier, namely, the session x, corresponding to DNAI-b.

In an implementation, if the AMF determines that there is no session identifier corresponding to the target network access identifier, the AMF sends a session query response (namely, the response #c) to the SMF 1. The session query response is empty. The AMF does not include the identifier of the reused session. Alternatively, the identifier of the reused session is empty.

Optionally, the response #c may further include indication information. The indication information indicates that the terminal is to transmit the target service by using the session x, or indicates that there is no session identifier corresponding to the target network access identifier in existing sessions.

S1006: The SMF 1 determines a session for transmitting the target service.

In an implementation, the SMF 1 receives the response #c. If the response #c includes the session identifier session x corresponding to the target network access identifier, the SMF 1 determines that the target service is to be transmitted by using the session x. That is, the SMF 1 determines that the session x can be reused for the target service.

In an implementation, the SMF 1 receives the response #c. If the response #c is empty, or the indication information in the response #c indicates that there is no session identifier corresponding to the target network access identifier in the existing sessions, optionally, the SMF 1 may trigger the terminal to create a session corresponding to the target service. For a procedure of creating the session herein, refer to the foregoing embodiments. Details are not described herein again.

S1007: The SMF 1 sends information #b2 to the terminal, where the information #b2 is for determining the session for transmitting the target service.

In an implementation, if the SMF 1 determines that there is a session identifier corresponding to the target network access identifier, the SMF 1 sends the information #b2 to the terminal, where the information #b2 includes the session identifier, namely, the session x, corresponding to DNAI-b.

In an implementation, if the SMF 1 determines that there is no session corresponding to the target network access identifier, the SMF 1 sends the information #b2 to the terminal, where the information #b2 is for triggering the terminal to establish a new session. Optionally, the information #b2 is empty, and does not include the identifier of the reused session, or the identifier of the reused session is empty.

Optionally, the information #b2 may further include indication information. The indication information indicates the terminal to transmit the target service by using the session x, or indicates that there is no session identifier corresponding to the target network access identifier in the existing sessions.

It should be noted that a manner in which the SMF 1 sends the information #b2 to the terminal may be that the SMF sends the information #b2 to the terminal via the AMF. For a sending manner herein, refer to the conventional technology. Details are not described herein in this application.

In another implementation, if the request #c is an NIN2 transfer message (Namf_Communication_NIN2Message Transfer) on an Namf interface, the following step S1008 may be performed.

S1008: The AMF sends information #b3 to the terminal, where the information #b3 is for determining the session for transmitting the target service.

In an implementation, if the AMF determines that there is a session identifier corresponding to the target network access identifier, the AMF sends a downlink NAS message (namely, the information #b3) to the terminal, where the NAS message includes the session identifier, namely, the session x, corresponding to DNAI-b.

In an implementation, if the AMF determines that there is no session identifier corresponding to the target network access identifier, the AMF sends a downlink NAS message (namely, the information #b3) to the terminal, where the NAS message is for triggering the terminal to establish a new session. Optionally, the NAS message is empty, and does not include the identifier of the reused session, or the identifier of the reused session is empty.

Optionally, the information #b3 may further include indication information. The indication information indicates the terminal to transmit the target service by using the session x, or indicates that there is no session identifier corresponding to the target network access identifier in the existing sessions.

S1009: The terminal determines the session for transmitting the target service.

In an implementation, the terminal receives the information #b2 or the information #b3. If the information #b2 or the information #b3 includes the session identifier-session x corresponding to the target service, the terminal determines to transmit the target service by using the session x.

Optionally, the terminal may initiate a domain name query request (namely, a DNS query) on the session x, to obtain the IP address corresponding to the target service.

In an implementation, the terminal receives the information #b2 or the information #b3. If the information #b2 or the information #b3 is empty, or the indication information in the information #b2 or the information #b3 indicates that there is no session identifier corresponding to the target network access identifier in the existing sessions, the terminal may establish a new session, so that the terminal can transmit a service on the created session. Optionally, the terminal initiates a domain name query request (namely, a DNS query) on the created session, to obtain the IP address corresponding to the target service. For a manner of creating the session herein, refer to the manner of establishing the first session in this application. Details are not described herein again.

It should be noted that, the session identifier represented by the session 1, the session 2, or the session x is merely an example. It should be understood that the session identifier may be alternatively represented in another form. This is not limited herein in this application.

Manner C

In this manner, in a process in which a terminal queries for an IP address corresponding to a target service, an SMF determines, by obtaining a correspondence between a network access identifier and a session identifier, whether a session needs to be created. If no session needs to be created, a reused session needs to be further determined, and a corresponding session identifier is sent to the terminal. If the session needs to be created, the SMF may trigger the terminal to create the session. It should be noted that the descriptions may be alternatively replaced with that the SMF determines whether an existing session can be reused; and if the existing session can be reused, the SMF sends an identifier corresponding to the reused session to the terminal; or if the existing session cannot be reused, the SMF triggers the terminal to create the session.

It should be noted that, if the terminal determines, according to a policy, that multiple sessions satisfy a requirement of the target service, the terminal may select any one of the multiple sessions to transmit a domain name query request corresponding to the target service.

Manner C is described in detail below with reference to FIG. 11 by using an example in which a terminal selects a second session (namely, a session for the terminal to access a central network) to transmit a domain name query request corresponding to a target service.

S1101: A second SMF (namely, an SMF 2) obtains a correspondence between a network access identifier and a session identifier.

In an implementation, the second SMF obtains the correspondence between the network access identifier and the session identifier from an AMF.

It should be noted that, if the session (namely, the second session) for accessing the central network is selected to transmit the domain name query request corresponding to the target service, the SMF 2 corresponding to the second session may subscribe to the AMF to obtain the correspondence between the network access identifier and the session identifier. In this manner, the SMF 2 can obtain information about all existing sessions for the terminal to access a local network.

By way of example but not limitation, the second SMF may obtain the correspondence between the network access identifier and the session identifier from the AMF in a session establishment process. A manner in which the second SMF obtains the correspondence between the network access identifier and the session identifier from the AMF is described below by using a process of establishing a first session and a process of establishing the second session as an example.

In the process of establishing the second session, after determining a network access identifier (which may be denoted as DNAI-a) corresponding to the service, the SMF 2 may send, to the AMF, a subscription request carrying DNAI-a, where the subscription request is for subscribing to a session identifier corresponding to DNAI-a. Then, in the process of establishing the first session, the AMF sends a correspondence between DNAI-a and an identifier of the first session to the SMF 2, and the SMF 2 stores the correspondence.

It should be noted that, if a session selected to transmit the domain name query request corresponding to the target service is a session (namely, the first session) corresponding to the local network, an SMF 1 corresponding to the first session may request the correspondence between the network access identifier and the session identifier from the AMF. In this manner, the SMF 1 can also obtain the information that is stored by the AMF and that is about all the existing sessions for the terminal to access the local network.

It should be understood that, in this embodiment, each session is managed by an SMF corresponding to the session. For example, the first session is managed by the SMF 1, and the second session is managed by the SMF 2.

S1102: The terminal sends information #d1 to the second SMF, where the information #d1 is for determining a session for sending the domain name query request corresponding to the target service, and the information #d1 includes a domain name of the target service.

For step S1102, refer to the descriptions of step S701 in FIG. 7. Details are not described herein again in this application.

S1103: The second SMF determines whether there is a session identifier corresponding to the target service.

In an implementation, if a domain name that is of a service and that is stored by the SMF 2 includes the domain name that is of the target service and that is in the information #d1, the SMF 2 determines that there is a session identifier corresponding to the domain name of the target service. Further, the SMF 2 determines the session identifier corresponding to the domain name of the target service. It should be understood that the descriptions may be alternatively replaced with that the SMF 2 determines the session identifier corresponding to the domain name of the target service.

By way of example but not limitation, the SMF 2 may determine, based on a correspondence between a domain name of a service and a network access identifier and the correspondence between the network access identifier and the session identifier, the session identifier corresponding to the domain name of the target service. For example, the SMF 2 first determines, based on a stored correspondence between the domain name of the service and the network access identifier, a network access identifier DNAI corresponding to the target service, where DNAI may be denoted as DNAI-b. Then, the SMF 2 determines, based on the correspondence that is between the network access identifier and the session identifier and that is obtained in step S1101, a session identifier corresponding to the DNAI-b, where a session identifier corresponding to the reused session may be denoted as a session x.

By way of example but not limitation, the SMF 2 may alternatively determine, based on a correspondence between a domain name of a service and a session identifier, the session identifier corresponding to the domain name of the target service. For example, the SMF 2 determines the correspondence between the domain name of the service and the session identifier based on a stored correspondence between the domain name of the service and a network access identifier and the correspondence that is between the network access identifier and the session identifier and that is obtained in step S1101, and then determines, based on the correspondence between the domain name of the service and the session identifier, the session identifier corresponding to the domain name of the target service, where a session identifier corresponding to the reused session may be denoted as a session x.

It may be understood that, in the foregoing implementations, the correspondence (which is also referred to as a mapping relationship) that is stored by the SMF 2 and that is between the domain name of the service and the DNAI includes a correspondence between the identifier of the target service and the target DNAI, and the correspondence that is obtained by the SMF 2 and that is between the network access identifier and the session identifier includes a correspondence between the target network access identifier and a target session identifier. The correspondence may be considered as a list or a table. This is not limited in this application. The identifier of the target service may be represented by the domain name of the target service.

In an implementation, if a domain name that is of a service and that is stored by the SMF 2 does not include the domain name that is of the target service and that is in the information #d1 the SMF 2 determines that there is no session identifier corresponding to the domain name of the target service S1104: The second SMF sends information #d2 to the terminal, where the information #d2 is for determining a session for transmitting the target service.

It should be noted that the determined session for transmitting the target service may be a session (namely, the reused session) in existing sessions, or may be a created session.

Figure 8:
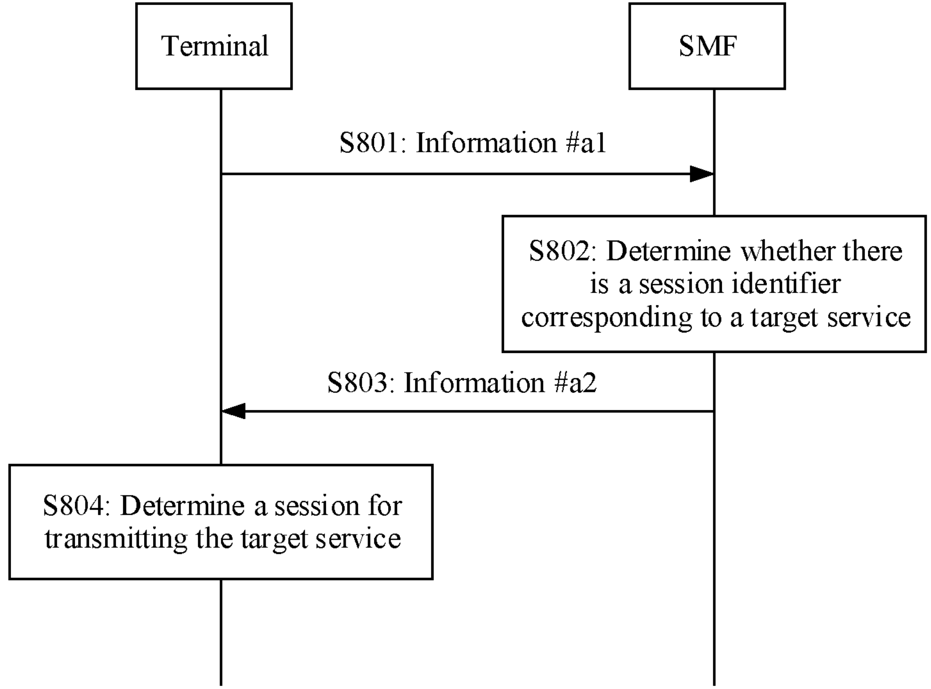
FIG. 8 is a schematic flowchart of a local network accessing method according to yet another embodiment of this application.

For step S1104, refer to the descriptions of step S803 in FIG. 8. Details are not described herein again in this application.

S1105: The terminal determines the session for transmitting the target service.

For step S1105, refer to the descriptions of step S804 in FIG. 8. Details are not described herein again in this application.

It should be noted that the method described in this embodiment is not only applicable to a case in which the terminal has established the second session for accessing the central network and the first session for accessing the local network, but also applicable to a case in which the terminal has established only the second session for accessing the central network. In this case, the method described in this embodiment may be further for triggering the process of establishing the second session. Similarly, the method described in this embodiment may be further applicable to a case in which the terminal has established the second session for accessing the central network and another session (for example, a third session) for accessing another local network. A quantity of sessions that have been established by the terminal and that are for accessing local networks is not limited herein.

Figures 11, 12:
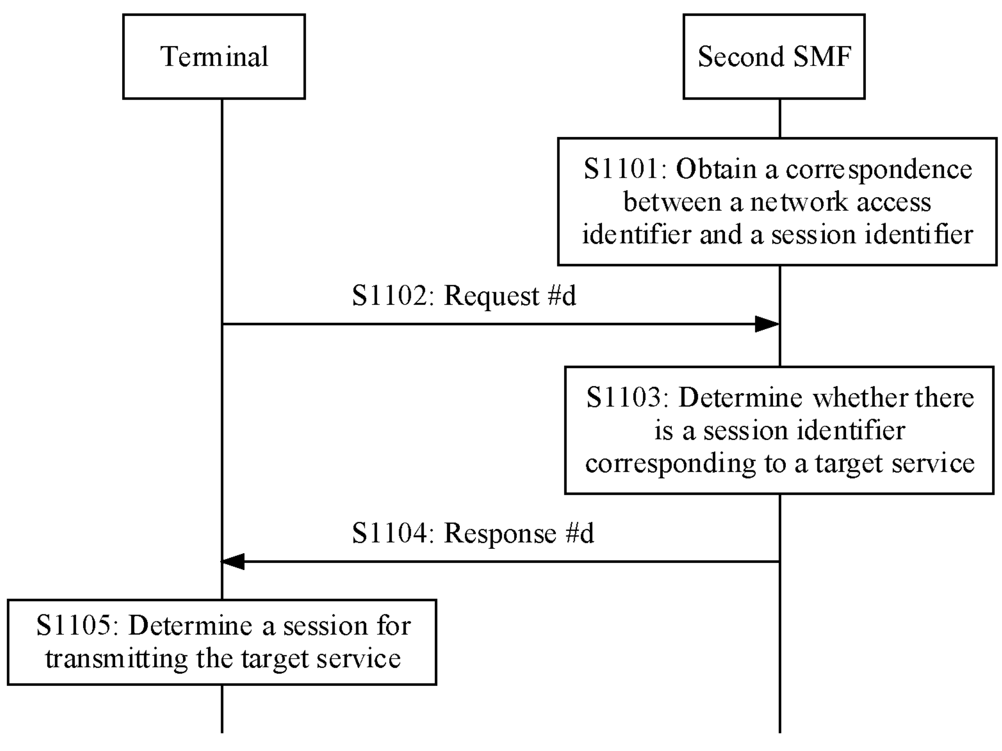
FIG. 11 is a schematic flowchart of a local network accessing method according to yet another embodiment of this application.
FIG. 12 is a schematic flowchart of an edge application server EAS discovering method according to an embodiment of this application.

FIG. 12 is a schematic flowchart of an edge application server EAS discovering method according to an embodiment of this application.

1201: An AF receives a discovery request from a first device, where the discovery request requests to discover an EAS, and the discovery request includes a preset condition. Accordingly, the first device sends the discovery request to the AF.

Optionally, the AF in the embodiment shown in FIG. 12 may be the EES 222 or the ECS 230 in the MEC architecture shown in FIG. 2.

In an embodiment, the first device is an SMF.

A terminal sends a session establishment request to an AMF to initiate a protocol data unit (PDU) session establishment procedure. The session establishment request may include at least one of parameters such as a PDU session identifier, single network slice selection assistance information (S-NSSAI), a data network name (DNN), an EAS discovery message (which is also called as discovery information below), and a filter (which is also called as a filter condition). The EAS discovery information may carry a domain name or an application identifier identifying an application, or may carry location information of the terminal. The domain name or the application identifier identifies an application requested by the terminal, and the application may be identified by using an FQDN. The filter indicates a condition that an application instance requested by the terminal satisfies. For example, the filter may indicate that an application instance requested by UE can support a multiplayer game, or may indicate a quality of service (QoS) requirement that the application instance requested by the terminal satisfies. It may be understood that the terminal may determine the filter based on a local configuration.

The AMF selects the SMF based on the S-NSSAI and the DNN, and sends parameters such as an identifier of the AMF, a permanent identifier of the terminal, the location information of the terminal, the PDU session identifier, the EAS discovery information, the S-NSSAI, and the DNN to the SMF.

In a session establishment process, the SMF invokes a service-based operation policy create control request (Npcf_SMPolicy Control_Create Request) for a PCF to request measurement information related to a PDU session from the PCF. In this process, the SMF may send the location information of the terminal and the domain name or the application identifier in the EAS discovery information to the PCF. The PCF generates a policy and charging control rule (PCC rule) based on a correspondence among the application identifier, a deployment location of an application server, and the domain name, and delivers the PCC rule to the SMF via a service-based operation policy create control response message (Npcf_SMPolicyControl_Create Response). The SMF stores the PCC rule including the correspondence among the application identifier, the deployment location of the application server, and the domain name. Optionally, the PCF may determine a corresponding AF ID or AF address based on the domain name or the application identifier, and send the AF ID or the AF address to the SMF. The AF may support application address resolution corresponding to the domain name or the application identifier that is requested by the UE.

The SMF selects an anchor UPF for the PDU session, and sends the discovery request to the AF, where the discovery request includes the filter.

It may be understood that the location information of the terminal may include a tracking area identity (TAI) of the terminal.

In another embodiment, the first device is a terminal.

A process in which the terminal establishes a session connection is the same as that in the foregoing embodiment. To avoid repetition, this is not limited herein. After selecting an anchor UPF for a session, an SMF may send a session establishment accept message to the terminal, where the session establishment accept message includes a DNAI list corresponding to EAS discovery information. After receiving the DNAI list, the terminal performs step 1201.

Optionally, the discovery request further includes at least one of an application identifier, a network access identifier list of a local network, or an EAS requirement.

The application identifier may be an identifier of an application requested by the terminal. The network access identifier list of the local network may include multiple data network access identifiers DNAIs, and the multiple DNAIs may separately identify locations of MEC platforms to which the terminal can be connected. The EAS requirement may be a requirement of the terminal on an EAS.

Optionally, the SMF may determine the network access identifier list of the local network based on location information of the terminal, a network topology, and a discovery message.

The SMF may determine, based on a current location of the terminal, the identifier of the application requested by the terminal in the discovery message, and the network topology, the MEC platforms to which the terminal can be connected at the current location. Locations of the MEC platforms are identified by using the DNAIs. That is, the network access identifier list (DNAI list) of the local network includes the DNAIs of the multiple MEC platforms to which the terminal can be connected at the current location.

It may be understood that the application required by the terminal, that is, an application corresponding to a domain name or an application identifier in the EAS discovery information, is deployed on each MEC platform to which the terminal can be connected.

1202: The AF determines, based on the discovery request, at least one EAS that satisfies the preset condition.

The AF may store, in a UDR, a correspondence among each application identifier (APP ID), a domain name supported by each application, a location of a MEC platform on which the application is located, and information about an application instance deployed on each MEC platform, as shown in Table 7.

TABLE 7

| Application identifier | Domain name supported by an application | Location of a MEC platform on which the application is located | Information about an application instance |
|---|---|---|---|
| Application-1 APP ID | FQDN | DNAI 1 | At DNAI-1, IP address corresponding to an application instance, service area of the application instance, and load information |
| | | DNAI 2 | At DNAI-2, IP address corresponding to an application instance, service area of the application instance, and load information |
| | | DNAI 3 | At DNAI-3, IP address corresponding to an application instance, service area of the application instance, and load information |

The application instance may also be understood as an application server, and the information about the application instance includes an IP address corresponding to the application instance of an application, a service area of the application instance, and load information.

In this way, the AF may select at least one EAS based on the FQDN, the filter, and the DNAI list. For example, if the DNAI list includes the multiple DNAIs, the AF may select an EAS based on the FQDN, the filter, and Table 7.

It may be understood that the SMF may also configure the correspondence in Table 7.

Optionally, the AF may alternatively select a target EAS based on the FQDN, the filter, the DNAI list, and a load status of an EAS.

1203: The AF sends a discovery response message to the first device, where the discovery response message includes an IP address of the at least one EAS. Accordingly, the first device receives the discovery response message from the AF.

The SMF determines a target DNAI based on the IP address of the at least one EAS in the discovery response message.

Optionally, if the first device is the SMF, the SMF may determine a breakout node (a ULCL/BP network element) based on the target DNAI. The breakout node is configured to perform breakout access on a central network and access data of the local network. In addition, the SMF may send a session accept message to the terminal, and include an IP address of the target EAS in the session accept message. In this way, the terminal may initiate service data transmission based on the IP address of the target EAS.

Optionally, the discovery response message further includes a serving area of each of the at least one EAS.

It may be understood that, if the discovery response message includes the serving area of each EAS, the session accept message may also include a serving area of the target EAS. The terminal may determine, based on the serving area after moving, whether an EAS request needs to be re-initiated. For example, when initiating a PDU session modification procedure, the terminal carries the discovery request.

It may be understood that if the first device is the terminal, the SMF may further send a new DNAI list to the terminal in real time after detecting that the terminal moves.

Figure 13:
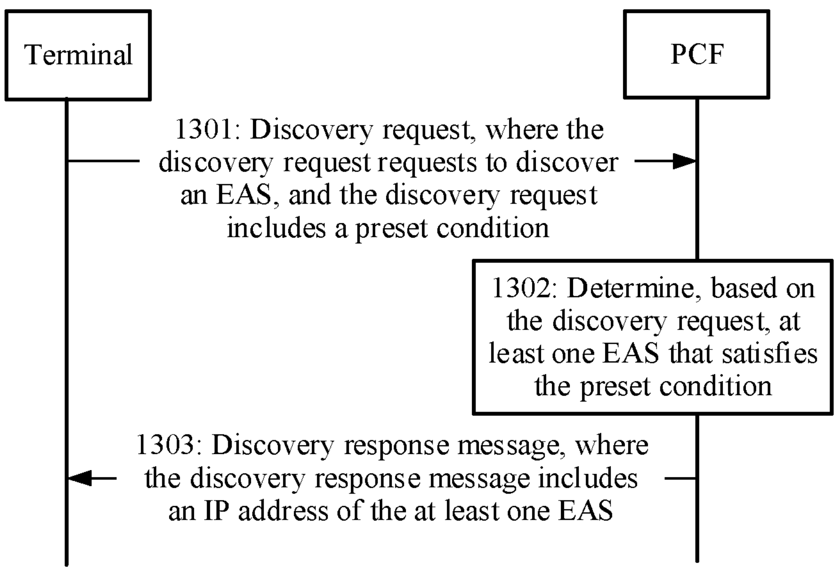
FIG. 13 is a schematic flowchart of an edge application server EAS discovering method according to another embodiment of this application.

FIG. 13 is a schematic flowchart of an edge application server EAS discovering method according to an embodiment of this application.

It should be noted that, unless otherwise specified, same terms in the embodiment shown in FIG. 13 and the embodiment shown in FIG. 12 have a same meaning.

It should be further noted that, when there is no logical contradiction, the embodiment shown in FIG. 13 may be combined with any implementation of the embodiment shown in FIG. 12.

1301: An SMF sends a discovery request to a PCF, where the discovery request requests to discover an EAS, and the discovery request includes a preset condition. Accordingly, the PCF receives the discovery request from the SMF.

It may be understood that the discovery request may be initiated by a terminal. The terminal sends the discovery request to the SMF, and the SMF forwards the discovery request to the PCF.

1302: The PCF determines, based on the discovery request, at least one EAS that satisfies the preset condition.

1303: The PCF sends a discovery response message to the SMF, where the discovery response message includes an IP address of the at least one EAS.

Embodiments described in this specification may be independent solutions, or may be combined based on internal logic. All these solutions fall within the protection scope of this application.

It may be understood that, in the foregoing method embodiments, the methods and the operations that are implemented by the devices may alternatively be implemented by a component (for example, a chip or a circuit) of a corresponding device.

The foregoing mainly describes the solutions provided in embodiments of this application from a perspective of interaction between the devices. It may be understood that, to implement the foregoing functions, each network element such as a transmitting end device or a receiving end device includes a corresponding hardware structure and/or software module for performing each function. A person skilled in the art should be able to be aware that, in combination with the examples described in embodiments disclosed in this specification, units and algorithm steps can be implemented by hardware or a combination of hardware and computer hardware in this application. Whether a function is performed by hardware or hardware driven by computer software depends on particular applications and design constraints of the technical solutions. A person skilled in the art may use different methods to implement the functions of each particular application, but it should not be considered that the implementation goes beyond the scope of this application.

In embodiments of this application, function module division may be performed on the transmitting end device or the receiving end device based on the foregoing method example. For example, each function module may be obtained through division corresponding to each function, or two or more functions may be integrated in one processing module. The integrated module may be implemented in a form of hardware, or may be implemented in a form of a software function module. It should be noted that, in embodiments of this application, division into the modules is an example, and is merely logical function division. Another division manner may be used during actual implementation. Descriptions are provided below by using an example in which each function module is obtained through division corresponding to each function.

It should be understood that examples in embodiments of this application are merely intended to help a person skilled in the art better understand embodiments of this application, but are not intended to limit the scope of embodiments of this application.

It should be understood that, in various embodiments of this application, sequence numbers of the foregoing processes do not mean an execution sequence. An execution sequence of the processes should be determined based on functions and internal logic of the processes, and should not constitute any limitation on an implementation process of embodiments of this application.

The methods provided in embodiments of this application are described above in detail with reference to FIG. 5 to FIG. 13. Apparatuses provided in embodiments of this application are described below in detail with reference to FIG. 14 to FIG. 21. It should be understood that descriptions of apparatus embodiments correspond to the descriptions of the method embodiments. Therefore, for content that is not described in detail, refer to the foregoing method embodiments. For brevity, details are not described herein again.

Figure 14:
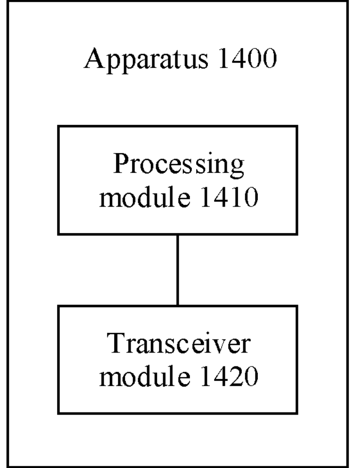
FIG. 14 is a schematic block diagram of a local network accessing apparatus according to an embodiment of this application.

FIG. 14 is a schematic block diagram of a local network accessing apparatus 1400 according to an embodiment of this application.

It should be understood that the apparatus 1400 may correspond to the terminal in the embodiment shown in FIG. 5, and may have any function of the terminal in the method. The apparatus 1400 includes a processing module 1410 and a transceiver module 1420.

The processing module 1410 is configured to obtain a first network access identifier, where the first network access identifier indicates a first local network.

The transceiver module 1420 is configured to send a session establishment request to a session management function network element, where the session establishment request requests to establish a first session, the first session is for a terminal to access the first local network, and the session establishment request includes the first network access identifier.

Optionally, the transceiver module 1420 is further configured to obtain at least one service and at least one network access identifier corresponding to the at least one service, where the at least one service includes a first service, and the processing module 1410 is configured to determine, based on the first service, the first network access identifier corresponding to the first service, where the at least one network access identifier includes the first network access identifier.

Optionally, the transceiver module 1420 is configured to:

receive a registration accept message from an access and mobility management function, where the registration accept message includes the at least one service and the at least one network access identifier corresponding to the at least one service; or receive a configuration update command message from an access and mobility management function, where the configuration update command message includes the at least one service and the at least one network access identifier corresponding to the at least one service.

Optionally, the transceiver module 1420 is further configured to obtain at least one location of the terminal and at least one network access identifier corresponding to the at least one location, where the at least one location of the terminal includes a first location, and the processing module 1410 is configured to determine, based on the first location, the first network access identifier corresponding to the first location, where the at least one network access identifier includes the first network access identifier.

Optionally, the processing module 1410 is further configured to determine, based on the first location and the first service, the first network access identifier corresponding to the first location and the first service.

Optionally, the transceiver module 1420 is further configured to receive, from the session management function network element, at least one network access identifier corresponding to a first location of the terminal; and the processing module 1410 is configured to:

determine the first network access identifier in the at least one network access identifier.

Optionally, the processing module 1410 is configured to select, from the at least one network access identifier based on a first service, the first network access identifier corresponding to the first service.

Optionally, the transceiver module 1420 is further configured to obtain the at least one service and the at least one network access identifier corresponding to the at least one service, where the at least one service includes a second service; and the processing module 1410 is configured to determine, based on the second service, a network access identifier corresponding to the second service; and control the transceiver module 1420 to send the second service based on a relationship between the network access identifier corresponding to the second service and the first network access identifier.

Optionally, the processing module 1410 is configured to:

if the network access identifier corresponding to the second service is the same as the first network access identifier, control the transceiver module 1420 to send the second service by using the first session;

if the network access identifier corresponding to the second service is different from the first network access identifier, control the transceiver module 1420 to send the second service by using a second session, where the second session is for the terminal to access a central network; or if the network access identifier corresponding to the second service is different from the first network access identifier, control the transceiver module 1420 to send the second service by using a third session, where the third session is for the terminal to access a local network corresponding to the second service.

Figure 15:
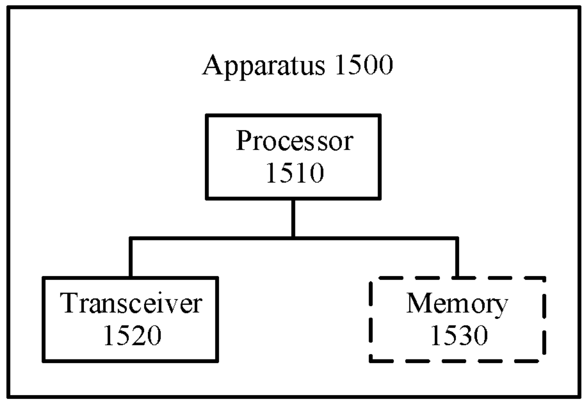
FIG. 15 is a schematic diagram of a structure of a local network accessing apparatus according to an embodiment of this application.

FIG. 15 shows a local network accessing apparatus 1500 according to an embodiment of this application. The apparatus 1500 may be the terminal in FIG. 5. The apparatus may use a hardware architecture shown in FIG. 15. The apparatus may include a processor 1510 and a transceiver 1520. Optionally, the apparatus may further include a memory 1530. The processor 1510, the transceiver 1520, and the memory 1530 communicate with each other through an internal connection path. A related function implemented by the processing module 1410 in FIG. 14 may be implemented by the processor 1510, and a related function implemented by the transceiver module 1420 may be implemented by the processor 1510 controlling the transceiver 1520.

Optionally, the processor 1510 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may refer to one or more devices, circuits, and/or processing cores configured to process data (for example, computer program instructions). For example, the processor 1510 may be a baseband processor or a central processing unit. The baseband processor may be configured to process a communication protocol and communication data. The central processing unit may be configured to control the local network accessing apparatus (for example, a base station, a terminal, or a chip), execute a software program, and process data of the software program.

Optionally, the processor 1510 may include one or more processors, for example, include one or more central processing units (CPUs). When the processor is one CPU, the CPU may be a single-core CPU, or may be a multi-core CPU.

The transceiver 1520 is configured to send and receive data and/or a signal, and receive data and/or a signal. The transceiver may include a transmitter and a receiver. The transmitter is configured to send the data and/or the signal, and the receiver is configured to receive the data and/or the signal.

The memory 1530 includes but is not limited to a random access memory (RAM), a read-only memory (ROM), an erasable programmable read-only memory (EPROM), and a compact disc read-only memory (CD-ROM). The memory 1530 is configured to store related instructions and data.

The memory 1530 is configured to store program code and data of the terminal, and may be a separate device or integrated into the processor 1510.

The processor 1510 is configured to control the transceiver to perform information transmission with the terminal. For details, refer to the descriptions in the method embodiment. Details are not described herein again.

During implementation, in an embodiment, the apparatus 1500 may further include an output device and an input device. The output device communicates with the processor 1510, and may display information in multiple manners. For example, the output device may be a liquid crystal display (LCD), a light emitting diode (LED) display device, a cathode ray tube (CRT) display device, or a projector. The input device communicates with the processor 701, and may receive an input from a user in multiple manners. For example, the input device may be a mouse, a keyboard, a touchscreen device, or a sensor device.

It may be understood that FIG. 15 shows only a simplified design of the local network accessing apparatus. During actual application, the apparatus may further separately include other necessary components, including but not limited to any quantity of transceivers, processors, controllers, memories, and the like, and all terminals that can implement this application shall fall within the protection scope of this application.

In an design, the apparatus 1500 may be a chip, for example, may be a communication chip that can be used in the terminal, and configured to implement a related function of the processor 1510 in the terminal. The chip may be a field programmable gate array, a dedicated integrated chip, a system chip, a central processing unit, a network processor, a digital signal processing circuit, or a microcontroller that is for implementing related functions, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal, or may be a circuit. The apparatus may be configured to perform an action performed by the terminal in the foregoing method embodiments.

Figure 16:
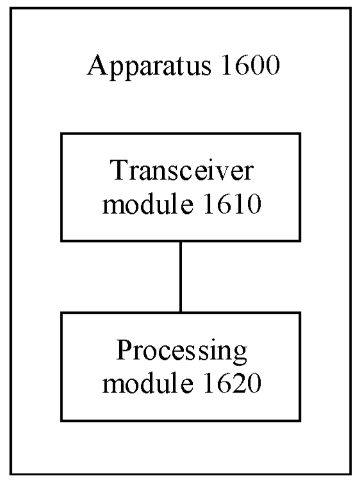
FIG. 16 is a schematic block diagram of a local network accessing apparatus according to another embodiment of this application.

FIG. 16 is a schematic block diagram of a local network accessing apparatus 1600 according to an embodiment of this application.

It should be understood that the apparatus 1600 may correspond to the SMF in the embodiment shown in FIG. 7, and may have any function of the SMF in the method. The apparatus 1600 includes a transceiver module 1610 and a processing module 1620.

The transceiver module 1610 is configured to send a trigger message to a terminal, where the trigger message is for triggering the terminal to establish a session;

the transceiver module 1610 is further configured to receive a first session establishment request from the terminal, where the first session establishment request requests to establish a first session, and the first session is for the terminal to access a local network;

the processing module 1620 is configured to determine a target network access identifier based on the first session establishment request, where the target network access identifier indicates a target local network; and the processing module 1620 is further configured to determine a target UPF based on the target network access identifier.

Optionally, the first session establishment request includes a session identifier of a second session, the second session is for the terminal to access a central network, and the transceiver module 1610 is further configured to obtain at least one session identifier of at least one session and at least one network access identifier of at least one local network corresponding to the at least one session identifier of the at least one session, where the at least one session identifier of the at least one session includes the session identifier of the second session; and the processing module 1620 is configured to determine, based on the session identifier of the second session, the target network access identifier corresponding to the session identifier of the second session.

Figure 17:
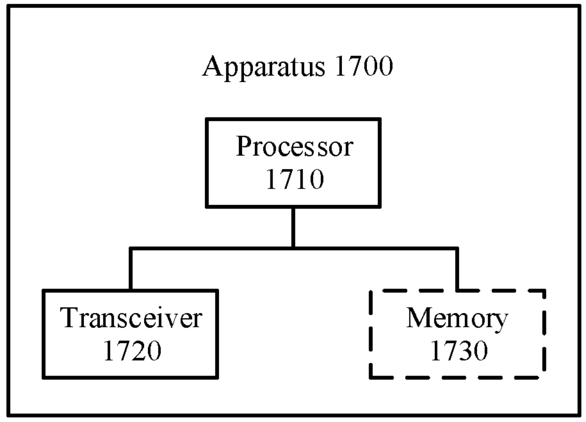
FIG. 17 is a schematic diagram of a structure of a local network accessing apparatus according to another embodiment of this application.

FIG. 17 shows a local network accessing apparatus 1700 according to an embodiment of this application. The apparatus 1700 may be the SMF in FIG. 7 or FIG. 8. The apparatus may use a hardware architecture shown in FIG. 17. The apparatus may include a processor 1710 and a transceiver 1720. Optionally, the apparatus may further include a memory 1730. The processor 1710, the transceiver 1720, and the memory 1730 communicate with each other through an internal connection path. A related function implemented by the processing module 1620 in FIG. 16 may be implemented by the processor 1710, and a related function implemented by the transceiver module 1610 may be implemented by the processor 1710 controlling the transceiver 1720.

Optionally, the processor 1710 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may refer to one or more devices, circuits, and/or processing cores configured to process data (for example, computer program instructions). For example, the processor 1710 may be a baseband processor or a central processing unit. The baseband processor may be configured to process a communication protocol and communication data. The central processing unit may be configured to control the local network accessing apparatus (for example, a base station, a terminal, or a chip), execute a software program, and process data of the software program.

Optionally, the processor 1710 may include one or more processors, for example, include one or more central processing units (CPUs). When the processor is one CPU, the CPU may be a single-core CPU, or may be a multi-core CPU.

The transceiver 1720 is configured to send and receive data and/or a signal, and receive data and/or a signal. The transceiver may include a transmitter and a receiver. The transmitter is configured to send the data and/or the signal, and the receiver is configured to receive the data and/or the signal.

The memory 1730 includes but is not limited to a random access memory (RAM), a read-only memory (ROM), an erasable programmable read-only memory (EPROM), and a compact disc read-only memory (CD-ROM). The memory 1730 is configured to store related instructions and data.

The memory 1730 is configured to store program code and data of the terminal, and may be a separate device or integrated into the processor 1710.

The processor 1710 is configured to control the transceiver to perform information transmission with the terminal. For details, refer to the descriptions in the method embodiment. Details are not described herein again.

During implementation, in an embodiment, the apparatus 1700 may further include an output device and an input device. The output device communicates with the processor 1710, and may display information in multiple manners. For example, the output device may be a liquid crystal display (LCD), a light emitting diode (LED) display device, a cathode ray tube (CRT) display device, or a projector. The input device communicates with the processor 701, and may receive an input from a user in multiple manners. For example, the input device may be a mouse, a keyboard, a touchscreen device, or a sensor device.

It may be understood that FIG. 17 shows only a simplified design of the local network accessing apparatus. During actual application, the apparatus may further separately include other necessary components, including but not limited to any quantity of transceivers, processors, controllers, memories, and the like, and all terminals that can implement this application shall fall within the protection scope of this application.

In a design, the apparatus 1700 may be a chip, for example, may be a communication chip that can be used in the terminal, and configured to implement a related function of the processor 1710 in the terminal. The chip may be a field programmable gate array, a dedicated integrated chip, a system chip, a central processing unit, a network processor, a digital signal processing circuit, or a microcontroller that is for implementing related functions, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be an SMF, or may be a circuit. The apparatus may be configured to perform an action performed by the terminal in the foregoing method embodiments.

Figure 18:
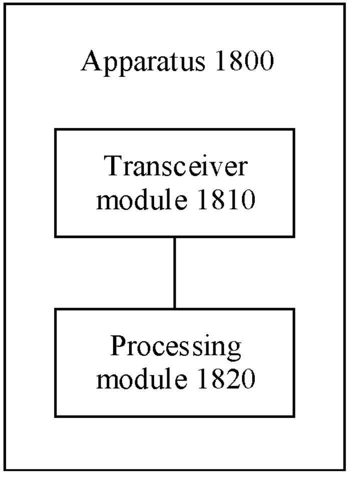
FIG. 18 is a schematic block diagram of a local network accessing apparatus according to still another embodiment of this application.

FIG. 18 is a schematic block diagram of a local network accessing apparatus 1800 according to an embodiment of this application.

It should be understood that the apparatus 1800 may correspond to the terminal in the embodiment shown in FIG. 7 or FIG. 8, and may have any function of the terminal in the method. The apparatus 1800 includes a transceiver module 1810 and a processing module 1820.

The transceiver module 1810 is configured to receive a trigger message, where the trigger message is for triggering a terminal to establish a session; and the processing module 1820 is configured to send a first message by using the transceiver module 1210 based on the trigger message, where the first message requests to establish a first session, and the first session is for the terminal to access a local network.

Optionally, the processing module 1820 is further configured to select a target session for a target service from the first session and the second session based on a first routing condition and a second routing condition, where the first routing condition corresponds to the first session, and the second routing condition corresponds to the second session; and the transceiver module 1810 is further configured to send the target service by using the target session.

Optionally, the first message includes a session identifier of a second session, the second session is for the terminal to access a central network, and the transceiver module 1810 is further configured to obtain at least one session identifier of at least one session and at least one network access identifier of at least one local network corresponding to the at least one session identifier of the at least one session; and the processing module 1820 is configured to determine, based on the session identifier of the second session, a target network access identifier corresponding to the session identifier of the second session.

Figure 19:
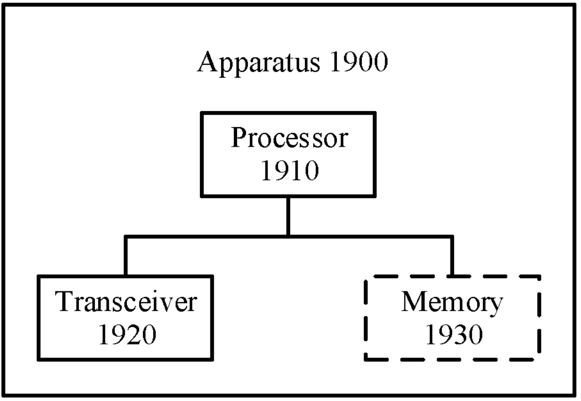
FIG. 19 is a schematic diagram of a structure of a local network accessing apparatus according to still another embodiment of this application.

FIG. 19 shows a local network accessing apparatus 1900 according to an embodiment of this application. The apparatus 1900 may be the terminal in FIG. 5. The apparatus may use a hardware architecture shown in FIG. 19. The apparatus may include a processor 1910 and a transceiver 1920. Optionally, the apparatus may further include a memory 1930. The processor 1910, the transceiver 1920, and the memory 1930 communicate with each other through an internal connection path. A related function implemented by the processing module 1410 in FIG. 14 may be implemented by the processor 1920, and a related function implemented by the transceiver module 1410 may be implemented by the processor 1910 controlling the transceiver 1920.

Optionally, the processor 1910 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may refer to one or more devices, circuits, and/or processing cores configured to process data (for example, computer program instructions). For example, the processor 1910 may be a baseband processor or a central processing unit. The baseband processor may be configured to process a communication protocol and communication data. The central processing unit may be configured to control the local network accessing apparatus (for example, a base station, a terminal, or a chip), execute a software program, and process data of the software program.

Optionally, the processor 1910 may include one or more processors, for example, include one or more central processing units (CPUs). When the processor is one CPU, the CPU may be a single-core CPU, or may be a multi-core CPU.

The transceiver 1920 is configured to send and receive data and/or a signal, and receive data and/or a signal. The transceiver may include a transmitter and a receiver. The transmitter is configured to send the data and/or the signal, and the receiver is configured to receive the data and/or the signal.

The memory 1930 includes but is not limited to a random access memory (RAM), a read-only memory (ROM), an erasable programmable read-only memory (EPROM), and a compact disc read-only memory (CD-ROM). The memory 1930 is configured to store related instructions and data.

The memory 1930 is configured to store program code and data of the terminal, and may be a separate device or integrated into the processor 1910.

The processor 1910 is configured to control the transceiver to perform information transmission with the terminal. For details, refer to the descriptions in the method embodiment. Details are not described herein again.

During implementation, in an embodiment, the apparatus 1900 may further include an output device and an input device. The output device communicates with the processor 1910, and may display information in multiple manners. For example, the output device may be a liquid crystal display (LCD), a light emitting diode (LED) display device, a cathode ray tube (CRT) display device, or a projector. The input device communicates with the processor 701, and may receive an input from a user in multiple manners. For example, the input device may be a mouse, a keyboard, a touchscreen device, or a sensor device.

It may be understood that FIG. 19 shows only a simplified design of the local network accessing apparatus. During actual application, the apparatus may further separately include other necessary components, including but not limited to any quantity of transceivers, processors, controllers, memories, and the like, and all terminals that can implement this application shall fall within the protection scope of this application.

In a design, the apparatus 1900 may be a chip, for example, may be a communication chip that can be used in the terminal, and configured to implement a related function of the processor 1910 in the terminal. The chip may be a field programmable gate array, a dedicated integrated chip, a system chip, a central processing unit, a network processor, a digital signal processing circuit, or a microcontroller that is for implementing related functions, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal, or may be a circuit. The apparatus may be configured to perform an action performed by the terminal in the foregoing method embodiments.

Figure 20:
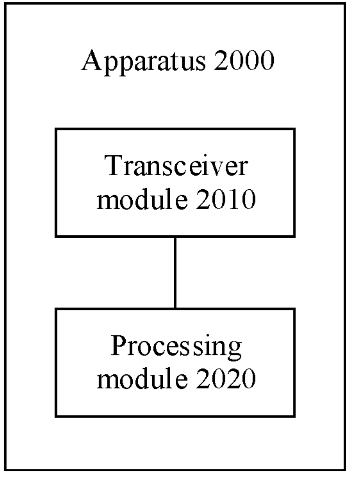
FIG. 20 is a schematic block diagram of a local network accessing apparatus according to still another embodiment of this application.

FIG. 20 is a schematic block diagram of a local network accessing apparatus 2000 according to an embodiment of this application.

It should be understood that the apparatus 2000 may correspond to the AMF in the embodiment shown in FIG. 5, and may have any function of the AMF in the method. The apparatus 2000 includes a transceiver module 2010 and a processing module 2020.

The transceiver module 2010 is configured to send a trigger message to a terminal, where the trigger message is for triggering the terminal to establish a session;

the transceiver module 2010 is further configured to receive a first message from the terminal, where the first message requests to establish a first session, and the first session is for the terminal to access a target local network;

the processing module 2020 is configured to determine a target network access identifier based on the first message, where the target network access identifier indicates the target local network;

the processing module 2020 is further configured to determine a first SMF based on the target network access identifier; and the transceiver module 2010 is further configured to send the target network access identifier to the first SMF, where the target network access identifier is for the first SMF to determine a target UPF.

Optionally, the first message includes a session identifier of a second session, the second session is for the terminal to access a central network, and the transceiver module 2010 is further configured to obtain at least one session identifier of at least one session and at least one network access identifier of at least one local network corresponding to the at least one session identifier of the at least one session; and the processing module 2020 is configured to determine, based on the session identifier of the second session and a mapping relationship, the target network access identifier corresponding to the session identifier of the second session.

Optionally, the transceiver module 2010 is further configured to receive a mapping relationship from a second SMF, where the second SMF is for the terminal to establish the second session.

Figure 21:
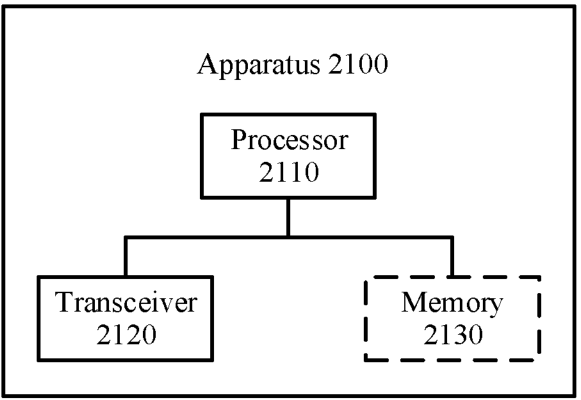
FIG. 21 is a schematic diagram of a structure of a local network accessing apparatus according to still another embodiment of this application.

FIG. 21 shows a local network accessing apparatus 2100 according to an embodiment of this application. The apparatus 2100 may be the AMF in FIG. 7. The apparatus may use a hardware architecture shown in FIG. 21. The apparatus may include a processor 2110 and a transceiver 2120. Optionally, the apparatus may further include a memory 2130. The processor 2110, the transceiver 2120, and the memory 2130 communicate with each other through an internal connection path. A related function implemented by the processing module 2020 in FIG. 20 may be implemented by the processor 2110, and a related function implemented by the transceiver module 2010 may be implemented by the processor 2110 controlling the transceiver 2120.

Optionally, the processor 2110 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may refer to one or more devices, circuits, and/or processing cores configured to process data (for example, computer program instructions). For example, the processor 2110 may be a baseband processor or a central processing unit. The baseband processor may be configured to process a communication protocol and communication data. The central processing unit may be configured to control the local network accessing apparatus (for example, a base station, a terminal, or a chip), execute a software program, and process data of the software program.

Optionally, the processor 2110 may include one or more processors, for example, include one or more central processing units (CPUs). When the processor is one CPU, the CPU may be a single-core CPU, or may be a multi-core CPU.

The transceiver 2120 is configured to send and receive data and/or a signal, and receive data and/or a signal. The transceiver may include a transmitter and a receiver. The transmitter is configured to send the data and/or the signal, and the receiver is configured to receive the data and/or the signal.

The memory 2130 includes but is not limited to a random access memory (RAM), a read-only memory (ROM), an erasable programmable memory (EPROM), and a compact disc read-only memory (CD-ROM). The memory 2130 is configured to store related instructions and data.

The memory 2130 is configured to store program code and data of the terminal, and may be a separate device or integrated into the processor 2110.

The processor 2110 is configured to control the transceiver to perform information transmission with the terminal. For details, refer to the descriptions in the method embodiment. Details are not described herein again.

During implementation, in an embodiment, the apparatus 2100 may further include an output device and an input device. The output device communicates with the processor 2110, and may display information in multiple manners. For example, the output device may be a liquid crystal display (LCD), a light emitting diode (LED) display device, a cathode ray tube (CRT) display device, or a projector. The input device communicates with the processor 701, and may receive an input from a user in multiple manners. For example, the input device may be a mouse, a keyboard, a touchscreen device, or a sensor device.

It may be understood that FIG. 21 shows only a simplified design of the local network accessing apparatus. During actual application, the apparatus may further separately include other necessary components, including but not limited to any quantity of transceivers, processors, controllers, memories, and the like, and all terminals that can implement this application shall fall within the protection scope of this application.

In a design, the apparatus 2100 may be a chip, for example, may be a communication chip that can be used in the terminal, and configured to implement a related function of the processor 2110 in the terminal. The chip may be a field programmable gate array, a dedicated integrated chip, a system chip, a central processing unit, a network processor, a digital signal processing circuit, or a microcontroller that is for implementing related functions, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be an AMF, or may be a circuit. The apparatus may be configured to perform an action performed by the terminal in the foregoing method embodiments.

All or some of the foregoing embodiments may be implemented by using software, hardware, firmware, or any combination thereof. When software is used for implementation, embodiments may be implemented completely or partially in a form of a computer program product. The computer program product includes one or more computer instructions. When the computer instruction is loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

It should be understood that the processor may be an integrated circuit chip, and has a signal processing capability. In an implementation process, steps in the foregoing method embodiments may be implemented by using an integrated logic circuit of hardware in the processor, or by using instructions in a form of software. The foregoing processor may be a general-purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, steps, and logical block diagrams disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory, and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

In this application, "at least one" refers to one or more, and "multiple" refers to two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following" or a similar expression thereof means any combination of these items, and includes a singular item or any combination of plural items. For example, at least one of a, b, or c may represent a, b, c, a combination of a and b, a combination of a and c, a combination of b and c, or a combination of a, b, and c, where a, b, and c may be in a singular or plural form.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments in any proper manner. It should be understood that, in various embodiments of this application, sequence numbers of the foregoing processes do not mean an execution sequence. An execution sequence of the processes should be determined based on functions and internal logic of the processes, and should not constitute any limitation on an implementation process of embodiments of this application.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed by various computer-readable media that store various data structures. The components may communicate by using a local and/or remote process and according to, for example, a signal having one or more data packets (for example, data from two components interacting with another component in a local system, in a distributed system, and/or across a network such as the internet interacting with another system by using a signal).

It should be further understood that "first", "second", and various numbers in this specification are merely used for differentiation for ease of description, and are not construed as a limitation to the scope of embodiments of this application.

It should be understood that the term "and/or" in this specification describes only an association relationship between associated objects and represents that three relationships may exist. For example, A and/or B may represent the following three cases: Only A exists, both A and B exist, and only B exists. When only A or only B exists, a quantity of A or B is not limited. In an example in which only A exists, it may be understood as that there is one or more A.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one location, or may be distributed on multiple network units. Some or all of the units may be selected based on an actual requirement to achieve the objectives of the solutions in embodiments In addition, functional units in embodiments of this application may be integrated into one processing unit, each unit may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A local network accessing method, comprising:

sending a trigger message to a terminal, the trigger message being for triggering the terminal to establish a session;

receiving a first message from the terminal, the first message requesting to establish a first session for the terminal to access a target local network, the first message comprising session attribute information;

determining a target network access identifier based on the session attribute information in the first message and a correspondence between the network access identifier and the session attribute, the target network access identifier indicating the target local network, wherein the correspondence between the network access identifier and the session attribute is stored during a second session, the second session is established before establishing the first session, and the network access identifier in the correspondence is determined in a process of establishing the second session;

determining a first session management function network element based on the target network access identifier; and sending the target network access identifier to the first session management function network element, the target network access identifier is for the first session management function network element to determine a target user plane function network element.

2. The local network accessing method according to claim 1, wherein the method further comprises:

deleting the target network access identifier in a process of establishing the first session.

3. The local network accessing method according to claim 2, wherein the first message comprises a session identifier of a second session, the second session is for the terminal to access a central network, and the method further comprises:

obtaining at least one session identifier of the second session and at least one network access identifier of at least one local network corresponding to the at least one session identifier of the second session; and the determining the target network access identifier based on the first message comprises:

determining, based on the session identifier of the second session, the target network access identifier corresponding to the session identifier of the second session.

4. The local network accessing method according to claim 3, wherein the obtaining the at least one session identifier of the second session and the at least one network access identifier of the at least one local network corresponding to the second session identifier of the at least one session comprises:

receiving, from a second session management function network element, the second session identifier of the at least one session and the at least one network access identifier of the at least one local network corresponding to the at least one session identifier of the second session, wherein the second session management function network element is for the terminal to establish the second session.

5. The local network accessing method according to claim 2, wherein the method further comprises:

receiving a first request, wherein the first request comprises the target network access identifier;

determining a session identifier of a target session corresponding to the target network access identifier; and sending a first response to a first network element, wherein the first response comprises the session identifier of the target session, or sending second information to a second network element, wherein the second information comprises the session identifier of the target session.

6. The local network accessing method according to claim 5, wherein before the determining the session identifier of the target session corresponding to the target network access identifier, the method further comprises:

obtaining a correspondence between the target network access identifier and the session identifier of the target session.

7. An apparatus, comprising:

a memory storing instructions; and at least one processor in communication with the memory, the at least one processor configured, upon execution of the instructions, to perform the following steps:

send a trigger message to a terminal, the trigger message triggering the terminal to establish a session;

receive a first message from the terminal, the first message requesting to establish a first session for the terminal to access a target local network, the first message comprising session attribute information;

determine a target network access identifier based on the session attribute information in the first message, the target network access identifier indicating the target local network, wherein the correspondence between the network access identifier and the session attribute is stored during a second session, the second session is established before establishing the first session, and the network access identifier in the correspondence is determined in a process of establishing the second session;

determine a first session management function network element based on the target network access identifier; and send the target network access identifier to the first session management function network element, the target network access identifier is for the first session management function network element to determine a target user plane function network element.

8. The apparatus according to claim 7 wherein the instructions further cause the processor to:

delete the target network access identifier in a process of establishing the first session.

9. The apparatus according to claim 8, wherein the first message comprises a session identifier of a second session, the second session is for the terminal to access a central network, and the instructions further cause the processor to:

obtain at least one session identifier of the second session and at least one network access identifier of at least one local network corresponding to the at least one session identifier of the second session; and determine, based on the session identifier of the second session, the target network access identifier corresponding to the session identifier of the second session.

10. The apparatus according to claim 9, wherein the instructions further cause the processor to:

receive, from a second session management function network element, the at least one session identifier of the second session and the at least one network access identifier of the at least one local network corresponding to the at least one session identifier of the second session, wherein the second session management function network element is for the terminal to establish the second session.

11. The apparatus according to claim 8, wherein the instructions further cause the processor to:

receive a first request, wherein the first request comprises the target network access identifier;

determine a session identifier of a target session corresponding to the target network access identifier; and send a first response to a first network element, wherein the first response comprises the session identifier of the target session, or send second information to a second network element, wherein the second information comprises the session identifier of the target session.

12. The apparatus according to claim 11, wherein the instructions further cause the processor to, before the determining the session identifier of the target session corresponding to the target network access identifier:

obtain a correspondence between the target network access identifier and the session identifier of the target session.

13. A local network accessing method, comprising:

sending, by an access and mobility management function, a trigger message to a terminal, the trigger message triggering the terminal to establish a session;

receiving, by the access and mobility management function, a first message from the terminal, the first message requesting to establish a first session for the terminal to access a target local network, the first message comprising session attribute information;

determining, by the access and mobility management function, a target network access identifier based on the session attribute information in the first message and a correspondence between the network access identifier and the session attribute, the target network access identifier indicating the target local network, wherein the correspondence between the network access identifier and the session attribute is stored during a second session, the second session is established before establishing the first session, and the network access identifier in the correspondence is determined in a process of establishing the second session;

determining, by the access and mobility management function, a first session management function network element based on the target network access identifier;

sending, by the access and mobility management function to the first session management function network element, the target network access identifier, the target network access identifier is for the first session management function network element to determine a target user plane function network element; and receiving, by the first session management function network element, the target network access identifier.

14. The method according to claim 13, wherein the method further comprises:

deleting, by the access and mobility management function, the target network access identifier in a process of establishing the first session.

* * * * *